US012675854B2

(12) United States Patent
Sun et al.

(10) Patent No.: US 12,675,854 B2
(45) Date of Patent: Jul. 7, 2026

(54) METHODS AND APPARATUS TO PERFORM MASK-BASED DEPTH ENHANCEMENT FOR MULTI-VIEW SYSTEMS

(71) Applicant: Intel Corporation, Santa Clara, CA (US)

(72) Inventors: Yanying Sun, Shanghai (CN); Jianhui Dai, Shanghai (CN); Kin-Hang Cheung, San Jose, CA (US); Qingfeng Li, Hillsboro, OR (US); Hua Zhang, Shanghai (CN); Yesheng Xu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 374 days.

(21) Appl. No.: 18/573,971

(22) PCT Filed: Oct. 28, 2021

(86) PCT No.: PCT/CN2021/126952
§ 371 (c)(1),
(2) Date: Dec. 22, 2023

(87) PCT Pub. No.: WO2023/070421
PCT Pub. Date: May 4, 2023

(65) Prior Publication Data
US 2024/0289929 A1     Aug. 29, 2024

(51) Int. Cl.
*G06T 7/50* (2017.01)
*G06T 5/20* (2006.01)
(Continued)

(52) U.S. Cl.
CPC .................. *G06T 5/77* (2024.01); *G06T 5/20* (2013.01); *G06T 7/13* (2017.01); *G06T 7/50* (2017.01);
(Continued)

(58) Field of Classification Search
CPC .... G06T 5/77; G06T 5/20; G06T 7/13; G06T 7/50; G06T 7/90; G06T 2207/10024;
(Continued)

(56) References Cited

U.S. PATENT DOCUMENTS

| | | | | |
|---|---|---|---|---|
| 2009/0022396 A1* | 1/2009 | Watanabe | ................. | G06T 5/00 |
| | | | | 382/167 |
| 2010/0080448 A1* | 4/2010 | Tam | .......................... | G06T 7/50 |
| | | | | 382/167 |

(Continued)

FOREIGN PATENT DOCUMENTS

| | | |
|---|---|---|
| CN | 103927717 A | 7/2014 |
| CN | 105144710 A | 12/2015 |
| CN | 109844819 A | 6/2019 |

OTHER PUBLICATIONS

International Searching Authority, "International Preliminary Report on Patentability," issued in connection with International Application No. PCT/CN2021/126952, mailed on May 10, 2024, 6 pages.
(Continued)

*Primary Examiner* — Ali Bayat
(74) *Attorney, Agent, or Firm* — Hanley, Flight & Zimmerman, LLC

(57) ABSTRACT

Methods and apparatus to perform mask-based depth enhancement for multi-view systems are disclosed herein. An example apparatus to adjust an input depth image of an image frame including the input depth image and an input color image includes at least one memory, instructions in the apparatus, and processor circuitry to execute the instructions to identify a color patch and a depth patch for an image pixel in a border area of the image frame, output an adjusted depth map based on at least one of (i) a mismatch between values of the color patch and a center pixel color of the color patch or (ii) a mismatch between values of the depth patch and a center pixel depth of the depth patch, output an adjusted
(Continued)

mask map associated with the input depth image based on a position of at least one camera used to capture the image, and perform iterative depth data gap filling based on the adjusted depth map and the adjusted mask map to obtain an adjusted depth image corresponding to the input depth image.

20 Claims, 17 Drawing Sheets

(51) Int. Cl.
| | |
|---|---|
| *G06T 5/77* | (2024.01) |
| *G06T 7/13* | (2017.01) |
| *G06T 7/90* | (2017.01) |

(52) U.S. Cl.
CPC ...... *G06T 7/90* (2017.01); *G06T 2207/10024* (2013.01)

(58) Field of Classification Search
CPC ... G06T 5/70; G06T 7/11; G06T 7/155; G06T 2207/10028
USPC ........................................................ 382/103
See application file for complete search history.

(56) References Cited

U.S. PATENT DOCUMENTS

| | | | |
|---|---|---|---|
| 2011/0285910 A1* | 11/2011 | Bamji | .................. H04N 25/705 |
| | | | 348/E9.037 |
| 2012/0127270 A1* | 5/2012 | Zhang | ..................... G06T 7/579 |
| | | | 348/E13.064 |
| 2015/0036926 A1* | 2/2015 | Choi | ....................... G06F 18/22 |
| | | | 382/167 |
| 2016/0048970 A1 | 2/2016 | Loghman et al. | |
| 2016/0063715 A1* | 3/2016 | Wan | .......................... G06T 3/40 |
| | | | 382/195 |
| 2017/0372510 A1 | 12/2017 | Ye | |
| 2021/0217203 A1* | 7/2021 | Kim | ....................... G06T 9/001 |

OTHER PUBLICATIONS

International Searching Authority, "Written Opinion of the International Searching Authority," issued in connection with International Patent Application No. PCT/CN2021/126952, mailed on Jul. 20, 2022, 4 Pages.
International Searching Authority, "International Search Report," issued in connection with International Application No. PCT/CN2021/126952, mailed on Jul. 20, 2022, 3 pages.

* cited by examiner

200

DEPTH ADJUSTMENT CIRCUITRY
202

214

| PATCH IDENTIFICATION CIRCUITRY 204 | PIXEL COMPARISON CIRCUITRY 206 |

| THRESHOLD IDENTIFICATION CIRCUITRY 208 | DEPTH VALUE REMOVAL CIRCUITRY 210 |

DATA STORAGE
212

DEPTH DATA GAP FILL CIRCUITRY 402

Figure 3:
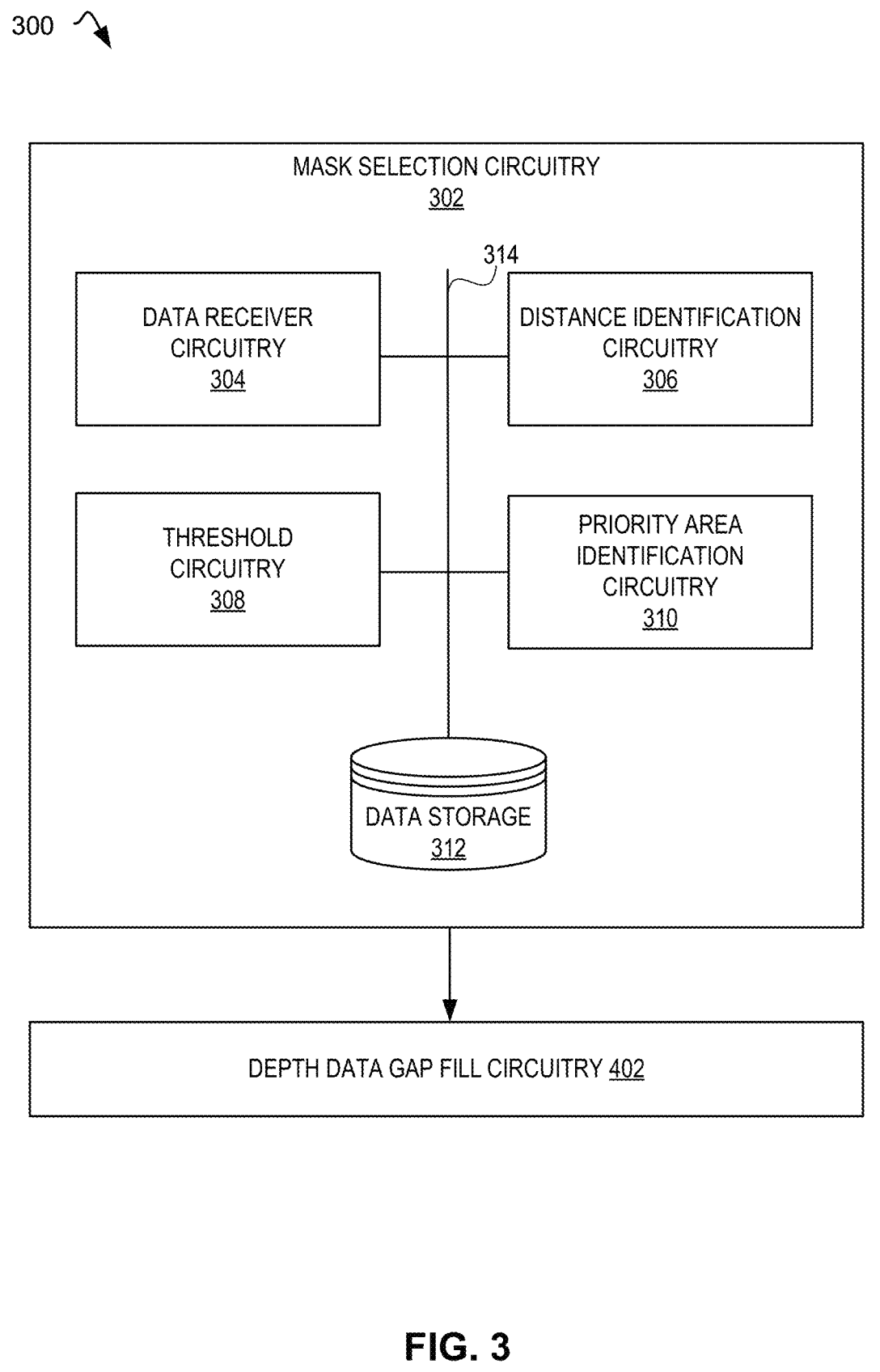

300

MASK SELECTION CIRCUITRY
302

314

DATA RECEIVER
CIRCUITRY
304

DISTANCE IDENTIFICATION
CIRCUITRY
306

THRESHOLD
CIRCUITRY
308

PRIORITY AREA
IDENTIFICATION
CIRCUITRY
310

DATA STORAGE
312

DEPTH DATA GAP FILL CIRCUITRY 402

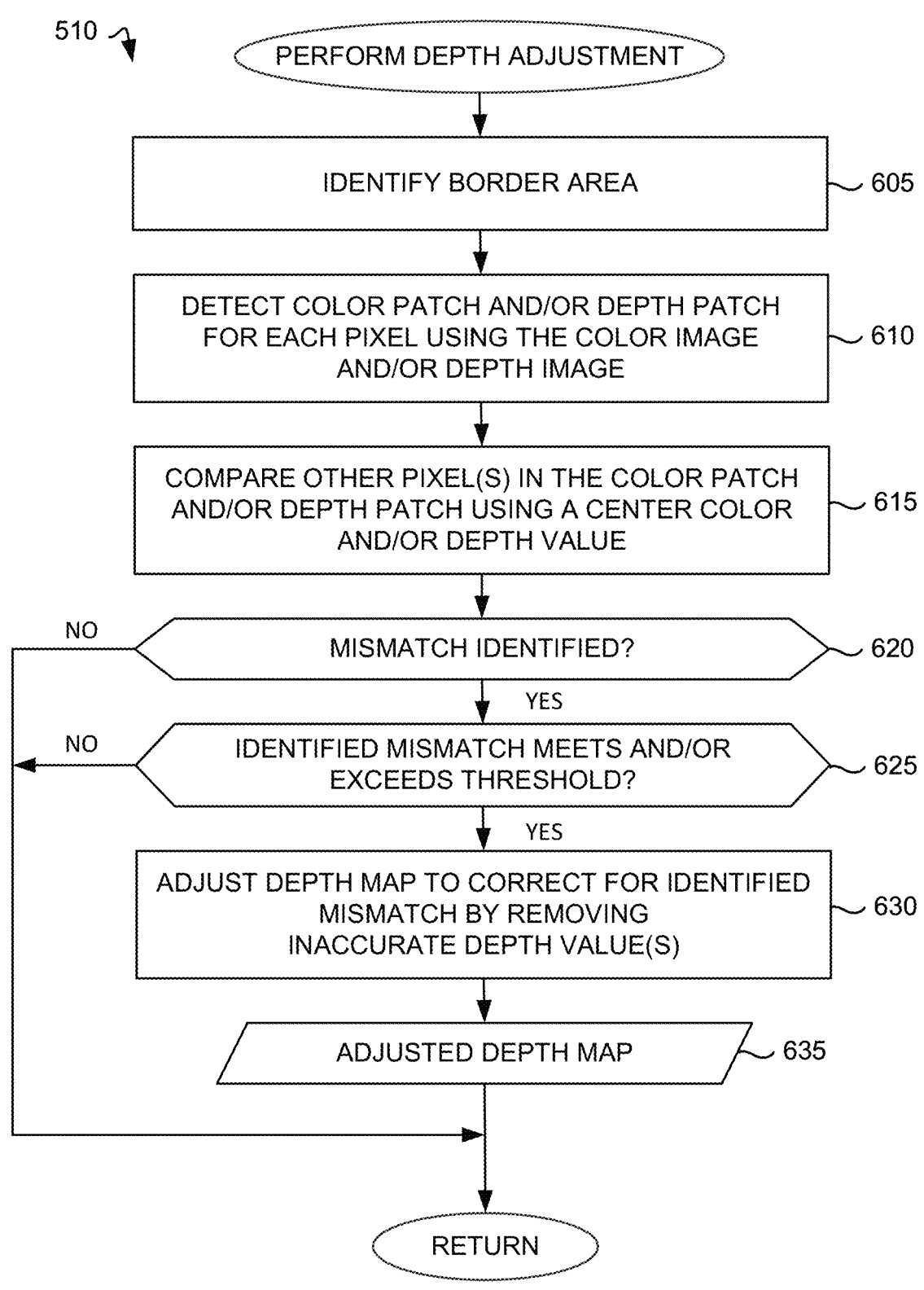

510

PERFORM DEPTH ADJUSTMENT

IDENTIFY BORDER AREA — 605

DETECT COLOR PATCH AND/OR DEPTH PATCH FOR EACH PIXEL USING THE COLOR IMAGE AND/OR DEPTH IMAGE — 610

COMPARE OTHER PIXEL(S) IN THE COLOR PATCH AND/OR DEPTH PATCH USING A CENTER COLOR AND/OR DEPTH VALUE — 615

MISMATCH IDENTIFIED? — 620
NO

YES

IDENTIFIED MISMATCH MEETS AND/OR EXCEEDS THRESHOLD? — 625
NO

YES

ADJUST DEPTH MAP TO CORRECT FOR IDENTIFIED MISMATCH BY REMOVING INACCURATE DEPTH VALUE(S) — 630

ADJUSTED DEPTH MAP — 635

RETURN

PERFORM MASK PROCESING

CAMERA POSITION — 705

IDENTIFY DISTANCE BETWEEN A PIXEL AND A BORDER LINE BASED ON CAMERA POSITION — 710

DETERMINE DISTANCE BETWEEN THE PIXEL AND A CENTER OF AN AREA OF INTEREST (e.g., A CENTER OF THE MASK MAP) — 715

PERFORM THRESHOLDING TO OBTAIN BINARY MASK MAP — 720

IDENTIFY PREFERRED AREA OF DEPTH MAP — 725

PROCESSED MASK — 730

RETURN

900

| | ART | BOOK | MOEBIUS | REINDEER | LAUNDRY | DOLL | AVERAGE |
|---|---|---|---|---|---|---|---|
| | 940 | 945 | 950 | 955 | 960 | 965 | 970 |
| 905 CLMF0 | 1.01 | 0.60 | 0.64 | 0.94 | 0.89 | 0.74 | 0.80 |
| 910 JBF | 0.84 | 0.63 | 0.69 | 0.93 | 0.88 | 0.76 | 0.79 |
| 915 MLS | 0.91 | 0.58 | 0.72 | 0.68 | 0.72 | 0.82 | 0.74 |
| 920 BICUBIC | 0.90 | 0.61 | 0.66 | 0.96 | 0.81 | 0.76 | 0.80 |
| 925 AR | 0.58 | 0.53 | 0.63 | 0.68 | 0.75 | 0.69 | 0.64 |
| 930 GUIDED | 1.20 | 0.63 | 0.67 | 0.96 | 0.94 | 0.76 | 0.86 |
| 935 PRESENT ALGORITHM | 0.32 | 0.42 | 0.45 | 0.47 | 0.57 | 0.62 | 0.47 |

FIG. 11

METHODS AND APPARATUS TO PERFORM MASK-BASED DEPTH ENHANCEMENT FOR MULTI-VIEW SYSTEMS

RELATED APPLICATION

This patent arises from the national stage of International Application No. PCT/CN2021/126952, which was filed on Oct. 28, 2021. International Application No. PCT/CN2021/126952 is hereby incorporated herein by reference in its entirety. Priority to International Application No. PCT/CN2021/126952 is hereby claimed.

FIELD OF THE DISCLOSURE

This disclosure relates generally to computing systems, and, more particularly, to methods and apparatus to perform mask-based depth enhancement for multi-view systems.

BACKGROUND

Multi-view RGB-depth (RGB-D) systems can be used for three-dimensional reconstruction and depth-image-based rendering (DIBR) applications. For example, an RGB-depth image includes a combination of an RGB image and a corresponding depth image. The depth image includes pixels that relate to a particular distance between a given image plane and a corresponding object in the RGB image. RGB-D images can be used in applications such as computer graphics, image processing, and computer vision, among others.

BRIEF DESCRIPTION OF THE DRAWINGS

FIG. 3 illustrates a block diagram of example mask selection circuitry constructed in accordance with teachings of this disclosure for performing the mask selection process of FIG. 1A.

FIG. 6 is a flowchart representative of example machine readable instructions that may be executed by example processor circuitry to implement the depth adjustment circuitry of FIG. 2.

FIG. 11 illustrates an example second illustrative comparison of data obtained when assessing depth data gap filling using the depth data gap fill circuitry of FIG. 4.

Figures 1A, 1B:
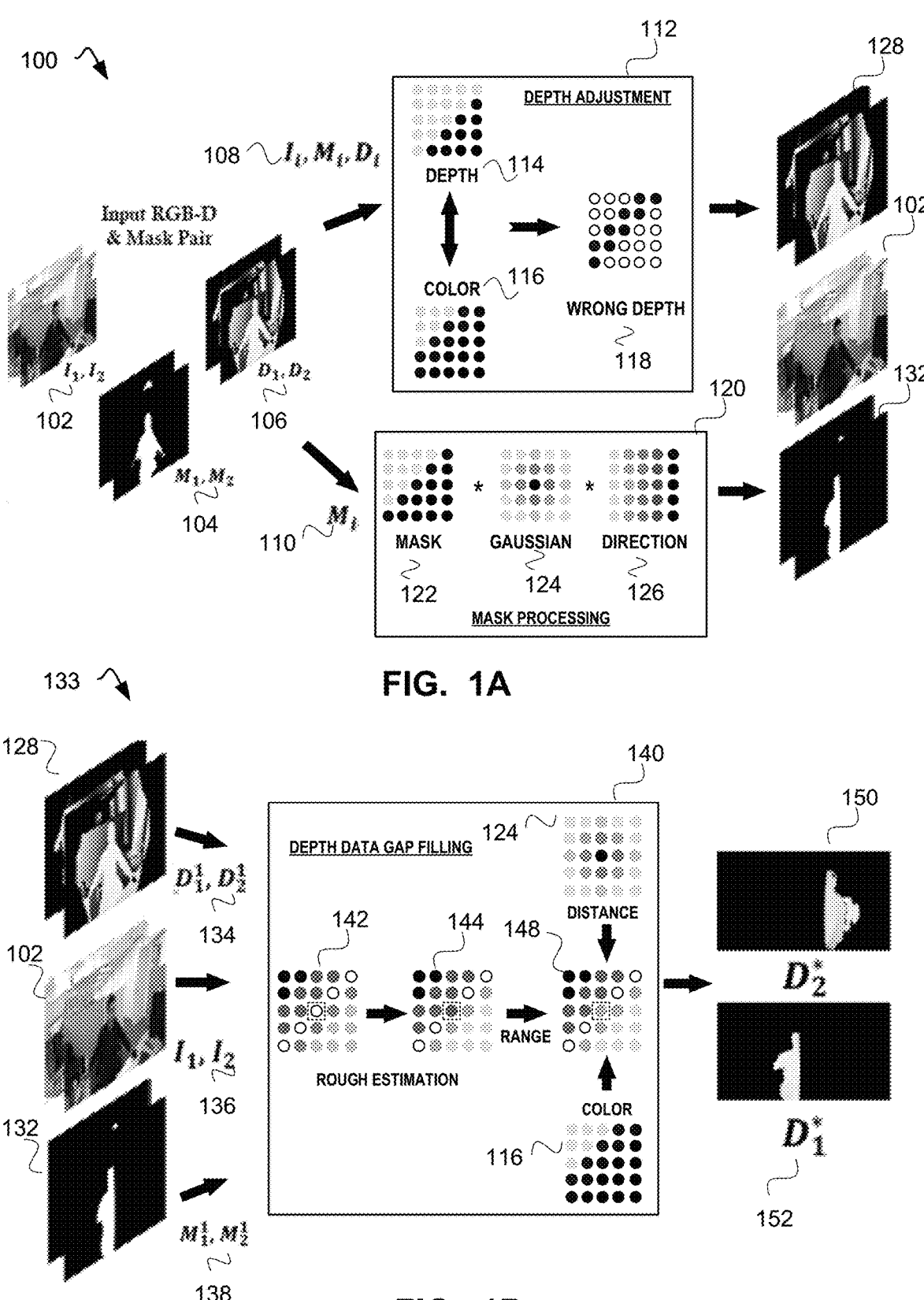
FIG. 1A illustrates an example depth adjustment process and an example mask selection process as part of the mask-based method for depth image completion disclosed herein.
FIG. 1B illustrates an example depth data gap filling process as part of the mask-based method for depth image completion disclosed herein.

The figures are not to scale. In general, the same reference numbers will be used throughout the drawing(s) and accompanying written description to refer to the same or like parts. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Multi-view systems (e.g., RGB-depth (RGB-D) systems) include sensors as depth-sensing devices that work in connection with, for example, a color sensor camera. As such, conventional images can be augmented with depth information on a per-pixel basis that corresponds to the distance from the sensor. Using a multi-view system simplifies tasks related to object detection, visual tracking, image-based rendering, three-dimensional reconstruction, and/or shape analysis. In some examples, mapping can be used to reconstruct a given scene in a three-dimensional format based on the obtained depth information. Several prior techniques can be used to acquire a depth map from depth sensors for purposes of 3D mapping and/or fusion. In some examples, spatial and/or temporal information (i.e., depth images from consecutive frames) can be used to fill depth map image gaps. Some prior techniques introduce a texture image (e.g., referring to color components such as RGB, YUV, etc.) corresponding to the depth map as a guide for rendering new representations or constraints.

Depth sensing can be especially critical in autonomous driving technologies, but current usage of light detection and ranging (LIDAR)-based systems and/or stereo-camera-based systems can have limited range. In some examples, deep neural network-based methods can be used to perform depth completion, but such methods can require significant computer and/or memory resources that can constrain their use in commercial applications. Other techniques aim to focus on the use of traditional depth completion methods (e.g., including dilation and/or filtering) with processing performed entirely on a central processing unit (CPU). However, possible drawbacks of existing solutions for depth completion include increased latency resulting from obtaining temporal information from neighboring frames in a live system, generating representations and/or constraints that are not compatible with new camera model(s), and using learning-based methods that are too compute and/or memory intensive to be applied in commercial usages. Additionally, disadvantages associated with prior depth completion techniques include such prior techniques being designed for only gap filling and/or not being useful for addressing wrong depth values and/or the prior techniques being designed for sparse LIDAR data such that it is not possible to insert accurate pixel values according to data derived from a local region.

In multi-view systems, depth maps from different views are fundamental for applications such as 3D reconstruction and depth-image-based rendering (DIBR). However, depth maps acquired from depth sensors often come with noisy and/or incorrect depth value(s), and/or missing data point(s) in one or both of the pixel value(s) and/or depth value(s). Methods and apparatus disclosed herein introduce a fast mask-based depth enhancement technique to fill in missing depth values in needed pixel points and/or filter out redundant points with pixel(s) or depth value(s) having insufficient accuracy. Furthermore, the methods and apparatus disclosed herein allow for significant improvements over prior techniques. In examples disclosed herein, a mask-based method for depth image completion includes the use of an additional mask with three modules that permit for incorrect depth adjustments, mask selecting, and/or depth data gap filling. In examples disclosed herein, incorrect depth adjustment includes the use of a patch-based analysis to determine which depth value(s) are inaccurate with the guidance of the generated texture image (e.g., RGB, YUV, etc.). In examples disclosed herein, a mask selecting module calculates the probability of each pixel in a depth map according to the mask and/or a camera position. In the examples disclosed herein, depth data gap filling uses a two-step pipeline with multiple joint bilateral and/or trilateral filters with identified constraints to iteratively fill in gaps in the depth data. As such, methods and apparatus disclosed herein can be used to improve a user's visual experience by introducing improvements in 3D reconstruction, free view generation, and/or other 3D generative applications.

FIG. 1A illustrates an example depth adjustment process and an example mask selection process 100 as part of the mask-based method for depth image completion disclosed herein. In the example of FIG. 1A, input into an example depth adjustment algorithm 112 and/or an example mask processing algorithm 120 includes an example input texture image with a corresponding depth image (e.g., RGB-D image) including example color-based input data 102 (e.g., $I_1$, $I_2$), example mask-based input data 104 (e.g., $M_1$, $M_2$), and/or example depth-based input data 106 (e.g., $D_1$, $D_2$). As such, the depth adjustment algorithm 112 and/or the mask processing algorithm 120 includes an image frame with a color image (e.g., color-based input data 102) and a depth image (e.g., depth-based input data 106). In some examples, the mask-based input data 104 includes a grey-scale image with a defined bit depth (e.g., a bit depth of 8 bits within a range of 0-255 bits). For example, a higher depth value can indicate an increased probability that the corresponding pixel is inside a part of a main object from the scene captured by the texture image with a corresponding depth image (e.g., RGB-D image). In some examples, masking is used to provide additional metadata to certain regions of a base image (e.g., for labeling a single class, hiding some portions of an image, revealing some portions of an image, etc.). For example, masking permits setting some of the pixel intensity values in an image to zero and other pixel values to non-zero. Using the color-based input data 102 (e.g., $I_1$, $I_2$), the mask-based input data 104 (e.g., $M_1$, $M_2$), and/or the depth-based input data 106 (e.g., $D_1$, $D_2$), a first data set 108

(e.g., including the color-based input data 102, the mask-based input data 104, and/or the depth-based input data 106) can be input to the depth adjustment algorithm 112 of FIG. 1A for further processing to perform depth adjustment. Likewise, a second data set 110 (e.g., including the mask-based input data 104) can be input to the mask processing algorithm 120 of FIG. 1A for further processing to perform mask selection.

The depth adjustment algorithm 112 includes example pixel-based depth processing 114, example pixel-based color processing 116, and/or example pixel-based wrong depth identification 118. In some examples, depth values captured by camera sensor(s) can be inaccurate and/or missing pixels. Such data inaccuracies can occur because of depth sensor physical properties, low resolutions and/or multi-camera interference. In some examples, flaws are more obvious along borders of objects because of uncertain orientations of object surface(s) near the border. Methods and apparatus disclosed herein can be used to determine border area(s) as well as correct the wrong depth values within the border area(s). For example, given that most wrong depth values are around object borders, methods and apparatus disclosed herein identify inaccurate depth values based on a mismatch of border(s) in a color image versus a depth image (e.g., using the pixel-based depth processing 114 and/or pixel-based color processing 116). As discussed in more detail in connection with FIG. 5, a border area can be identified using an erode operation, followed by identification of a square region around each pixel to determine whether a mismatch exits between color borders and depth borders. As shown in the example of FIG. 1A, the pixel-based depth processing 114 includes identification of depth borders (e.g., shaded pixels in the depth square region) whereas the pixel-based color processing 116 includes identification of color borders (e.g., shaded pixels in the color square region). A mismatch between the borders results in the wrong depth identification 118, which identifies the mismatched pixels (e.g., shaded pixels in the wrong depth square region). As described in connection with FIG. 6, the depth adjustment algorithm 112 adjusts the depth map (e.g., the adjusted depth map 128 represented as $$D_1^1, D_2^1$$

with the adjusted depth map 128 used as input into the depth data gap filling algorithm 140 of FIG. 1B.

The mask processing algorithm 120 of FIG. 1A includes example pixel-based mask processing 122, example gaussian-based processing 124, and/or example direction-based processing 126 using the second image data set 110 (e.g., including the mask-based input data 104). As described in connection with FIG. 5, the depth adjustment algorithm 112 removes inaccurate depth values in depth maps, while the mask processing algorithm 120 determines which positions of the depth map are important and/or should be maintained regardless of the pixel value. Specifically, the mask processing algorithm 120 addresses the quality of the mask, which can impact the quality of fused point cloud data processing (e.g., when data obtained from disparate data sources is fused together to enrich contextual analysis). For example, the mask processing algorithm 120 can be used to refine mask maps (e.g., mask-based input data 104) by addressing presence of inaccurate borders, presence of small data gaps and/or outliers, and/or the lack of positional preference. For example, due to the nature of deep neural networks, the raw mask (e.g., defined by mask-based input data 104) may not precisely fit the border of a main object. In the presence of other large objects near the main object of interest, a deep neural network can also produce an obscure border. Additionally, an ideal mask should not include any small gaps and/or glitches and should have a fully connected area. In some examples, the use of different camera positions during depth-based image (e.g., RGB-D image) capture causes a particular area of a depth map to vary from one camera to another. As such, the mask processing algorithm 120 disclosed herein considers the position of camera(s) used to capture the depth-based image to ascertain that pixel(s) of better quality are selected if needed. Accordingly, the mask processing algorithm 120 focuses on the removal of data gaps and/or outliers given that small noisy area(s) or hole(s) can result in unnecessary artifacts in point cloud fusion data processing.

Furthermore, the mask processing algorithm 120 can identify left vs. right camera capture (e.g., when using a binocular RGB-D image capture setup), thereby allowing the positional information of the image to be represented based on a left-based camera position or a right-based camera position. For example, the left camera captures more accurate and/or noiseless (e.g., artifact-free) depth information in the left area (e.g., closer to the left-based camera) while the right camera captures more accurate and/or noiseless (e.g., artifact-free) information in the right area (e.g., closer to the right-based camera). Additionally, mask processing algorithm 120 identifies an area around a center point of an image, as the center point is assumed to be more precise and important than area(s) that are father away from the center point. As described in connection with FIG. 7, the mask processing algorithm 120 includes mask-based depth data gap removal, including the calculation of pixel accuracy in the existing mask. Additionally, the mask processing algorithm 120 measures the distance between a given pixel and the border line, with gaussian-based processing 124 used to determine the distance between the given pixel and the center of the area of interest (e.g., shaded pixels representing center of area), and direction-based processing 126 used to identify image positioning (e.g., shaded pixels representing left- or right-hand based directional importance based on camera positioning). The mask processing algorithm 120 thereby adjusts the mask map (e.g., the adjusted mask map 132 represented as $$M_1^1, M_2^1$$

with the adjusted mask map 132 used as input into the depth data gap filling algorithm 140 of FIG. 1B.

FIG. 1B illustrates an example depth data gap filling process 133 as part of the mask-based method for depth image completion disclosed herein. In the example of FIG. 1B, the adjusted depth map 128 (e.g., $$D_1^1, D_2^1$$

the adjusted mask map 132 (e.g., $$M_1^1, M_2^1$$

and the original color-based input data 102 (e.g., $I_1$, $I_2$) are received by the depth data gap filling algorithm 140. The depth data gap filling algorithm 140 includes example rough estimation processing steps 142, 144 and an example range processing step 148 (e.g., using the pixel-based color processing 116 result and/or the gaussian-based processing 124 result). As described in connection with FIG. 8, the depth data gap filling process 133 includes filling depth values for pixels that are missing in the adjusted depth map 128 (e.g., $$D_1^1, D_2^1$$

but are identified as present in the adjusted mask map 132 (e.g., $$M_1^1, M_2^1$$

For example, the depth data gap filling process 133 relies on the assessment that pixels that are spatially close with each other tend to have similar depth values and the pixels that are close in color should also have similar depth values. In some examples, the use of a joint bilateral filter to fill the data gaps can be implemented, but while a joint bilateral filter alone can be used to achieve image smoothing, hole filling can be difficult when many pixels have no valid depth value, given that the interpolated depth value would fluctuate severely due to the unstable color jittering around a given pixel. Methods and apparatus disclosed herein include the use of a valid median filter module for rough estimation, followed by a more robust joint trilateral filter module for depth interpolation, with the process performed in an iterative manner.

In the example of FIG. 1B, the depth data gap filling process 133 can directly interpolate a pixel by using depth value information, given that lack of depth value use can increase artifact presence. For example, for some sensors, missing depth values often appear at edge areas where depth values change sharply. Directly interpolating in this area can be used to generate a smooth 'transitional zone' between two significantly different depth edges and cause severe artifacts. By using a joint trilateral filter as described herein, a depth constraint is added to the original bilateral kernel. For example, such a filter can be applied if the pixel is assigned with a non-zero value in the rough estimation processing steps 142, 144 (e.g., shaded region in the center square of rough estimation processing step 144), with the rough estimation used as an anchor point to add more robustness to the depth data gap filling process 133. For example, as shown in FIG. 1B, the example range processing step 148 relies on the pixel-based color processing 116 result and/or the gaussian-based processing 124 result to perform the depth data gap filling process more accurately. The output from the depth data gap filling process 133 includes updated depth map(s) 150, 152 (e.g., $D_1^*$, $D_2^*$), as determined using the depth data gap filling process-associated filtering of FIG. 1B.

Figure 2:
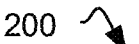
FIG. 2 illustrates a block diagram of example depth adjustment circuitry constructed in accordance with teachings of this disclosure for performing the depth adjustment process of FIG. 1A.

FIG. 2 illustrates a block diagram 200 of example depth adjustment circuitry 202 constructed in accordance with teachings of this disclosure for performing the depth adjustment algorithm 112 of FIG. 1A. In the illustrated example of FIG. 2, the depth adjustment circuitry 202 includes an example patch identification circuitry 204, an example pixel comparison circuitry 206, an example threshold identification circuitry 208, an example depth value removal circuitry 210, and an example data storage 212. The patch identification circuitry 204, the pixel comparison circuitry 206, the threshold identification circuitry 208, the depth value removal circuitry 210, and the data storage 212 are in communication using an example bus 214.

The patch identification circuitry 204 identifies a color patch and a depth patch for an image pixel in a border area of the image frame. For example, the patch identifying circuitry 204 receives an input depth-based image including the color-based input data 102 (e.g., $I_1$, $I_2$), the mask-based input data 104 (e.g., $M_1$, $M_2$), and/or the depth-based input data 106 (e.g., $D_1$, $D_2$) of FIG. 1A. In some examples, the patch identification circuitry 204 determines border area(s) of object(s) in the depth-based image (e.g., RGB-D image) as part of correcting the wrong depth values within the border area(s). For example, based on an assumption that most wrong depth values are around object borders, the depth adjustment circuitry 202 identifies inaccurate depth values based on a mismatch of border(s) in a color image versus a depth image. In some examples, the patch identification circuitry 204 identifies a border area using an erode operation, followed by identification of a square region around each pixel as part of determining whether a mismatch exits between color borders and depth borders. In some examples, the patch identification circuitry 204 determines the border area using an erode transformation on the mask map $M_i$ (e.g., mask-based input data 104 as represented by $M_1$, $M_2$), thereby obtaining a smaller mask $$M_i^{erode}.$$

In some examples, the patch identification circuitry 204 calculates the border area ($B_i$) as shown in accordance with Equation 1:

$$B_i = M_i - M_i^{erode} \qquad \text{Equation 1}$$

For each pixel (x, y) in $B_i$, the patch identification circuitry 204 identifies surrounding patch(s)

$$P_{i,x,y}^{color}$$

and $$P_{i,x,y}^{depth}$$

from the color image data (e.g., using color-based input data 102 as represented by $I_1$, $I_2$) and the depth image data (e.g., using depth-based input data 106 as represented by $D_1$, $D_2$), respectively. In some examples, the color patch (e.g., $$P_{i,x,y}^{color}$$

is of size k×k×3 (3 RGB channels) and the depth patch (e.g., $$P_{i,x,y}^{depth}$$

is of size k×k, in which k is the size of a local square window. For example, in FIG. 1A, the pixel-based depth processing 114 shows a depth patch result (e.g., square region with shading representing depth areas) while the pixel-based color processing 116 shows a color patch result (e.g., square region with shading representing color areas).

The pixel comparison circuitry 206 determines whether a mismatch exists between color borders and depth borders. As shown in the example of FIG. 1A, the pixel-based depth processing 114 includes identification of depth borders (e.g., shaded pixels in the depth square region) whereas the pixel-based color processing 116 includes identification of color borders (e.g., shaded pixels in the color square region), as performed using the patch identification circuitry 204. A mismatch between the borders results in the wrong depth identification 118 of FIG. 1A, which identifies the mismatched pixels (e.g., shaded pixels in the wrong depth square region). In some examples, the pixel comparison circuitry 206 determines a mispatch based on a comparison of pixels in the patches (e.g., $$P_{i,x,y}^{color}, P_{i,x,y}^{depth}$$

identified using the patch identification circuitry 204. In some examples, the pixel comparison circuitry 206 compares other pixels in the patch with a center color $I_i(x, y)$ and a depth value at the center location $D_i(x, y)$. If a pixel at location (x', y') differs from the center color and/or depth value at the center location (x, y) (i.e., surpasses one or more set thresholds), the pixel comparison circuitry 206 labels the pixel as different and/or mismatched. In some examples, the pixel comparison circuitry 206 can identify a Boolean-based patch for a pixel (x', y') in $$P_{i,x,y}^{color}$$

and $$P_{i,x,y}^{depth}$$

in accordance with Equations 2 and 3, where $Th_{color}$ and $Th_{depth}$ correspond to a color-based threshold and a depth-based threshold, respectively:

$$P_{i,x,y}^{color\_bool} = \begin{cases} 1, \left\| P_{i,x,y}^{color}(x', y') - I_i(x, y) \right\| > Th_{color} \\ 0, \left\| P_{i,x,y}^{color}(x', y') - I_i(x, y) \right\| \le Th_{color} \end{cases} \quad \text{Equation 2}$$

$$P_{i,x,y}^{depth\_bool} = \begin{cases} 1, \text{abs}\left(P_{i,x,y}^{depth}(x', y') - D_i(x, y)\right) > Th_{depth} \\ 0, \text{abs}\left(P_{i,x,y}^{depth}(x', y') - D_i(x, y)\right) \le Th_{depth} \end{cases} \quad \text{Equation 3}$$

In some examples, the pixel comparison circuitry 206 records color and depth edges in a pixel's (e.g., represented using (x, y)) local region using the Boolean-based color patch (e.g., $$P_{i,x,y}^{color\_bool}$$

and the Boolean-based depth patch (e.g., $$P_{i,x,y}^{depth\_bool}$$

respectively.

The threshold identification circuitry 208 determines a mismatch area ratio based on the pixel comparison circuitry 206 output to determine whether the mismatch area ratio (r) achieves a set threshold ($Th_{mismatch}$). In some examples, the set threshold can be defined in accordance with Equation 4, where N(flag) denotes the number of pixels that satisfy the condition flag=True, and Equation 5, where $D_i^1$ represents the adjusted depth map:

$$r = \frac{N\left(P_{i,x,y}^{depth\_bool} \; xor \; P_{i,x,y}^{color\_bool}\right)}{N\left(P_{i,x,y}^{depth} > 0\right)} \quad \text{Equation 4}$$

$$D_i^1(x, y) = \begin{cases} D_i(x, y) \text{ if } r < Th_{mismatch} \\ 0 \text{ if } r \ge Th_{mismatch} \end{cases} \quad \text{Equation 5}$$

In the example of Equation 4, the mismatch ratio (r) is determined based on an exclusive or operation (e.g., XOR operation), such that the output is true if the inputs are not alike. As such, the numerator determines the number of pixels that satisfy the condition of having either the Boolean-based color patch or the Boolean-based depth batch, but not both, while the denominator identifies the number of pixels that satisfy the condition that the Boolean-based depth patch has a value of greater than zero. Based on the value of the mismatch ratio (r), the depth map is generated such that mismatch ratios below the threshold are assigned a depth location and/or value, while the values at other depth locations are set to zero (e.g., when the ratio is greater than or equal to the threshold). As such, the threshold identification circuitry 208 determines the values for the adjusted depth map $D_i^1$ based on whether the mismatch area ratio (r) is below the set mismatch threshold ($Th_{mismatch}$) or exceeds and/or is equivalent to the set mismatch threshold ($Th_{mismatch}$).

Thus, in the illustrated example, the depth value removal circuitry 210 adjusts the depth map (e.g., the adjusted depth map 128 of FIG. 1 represented as $$D_1^1, D_2^1$$

based on the output of the threshold identification circuitry 208. For example, the depth value removal circuitry 210 retains the pixel values of the depth map(s)

$$D_1^1, D_2^1$$

when the mismatch area ratio r value falls below the mismatch threshold $Th_{mismatch}$ and removes the depth value (e.g., sets the depth value equivalent to zero) when the mismatch area ratio r value is equivalent to or exceeds the mismatch threshold $Th_{mismatch}$. The resulting adjusted depth map $D_i^1$ is used as input into the depth data gap fill circuitry 402 for further assessment and processing of the depth map(s). As such, the depth adjustment circuitry 202 outputs an adjusted depth map based on at least one of a mismatch between values of the color patch and a center pixel color of the color patch and/or a mismatch between values of the depth patch and a center pixel depth of the depth patch.

The data storage 212 can be used to store any information associated with the patch identification circuitry 204, the pixel comparison circuitry 206, the threshold identification circuitry 208, and/or the depth value removal circuitry 210. The example data storage 212 of the illustrated example of FIG. 2 can be implemented by any memory, storage device and/or storage disc for storing data such as flash memory, magnetic media, optical media, etc. Furthermore, the data stored in the example data storage 212 can be in any data format such as binary data, comma delimited data, tab delimited data, structured query language (SQL) structures, image data, etc.

FIG. 3 illustrates a block diagram of example mask selection circuitry 302 constructed in accordance with teachings of this disclosure for performing the mask processing algorithm of FIG. 1A. In FIG. 3, the mask selection circuitry 302 includes example data receiver circuitry 304, example distance identification circuitry 306, example threshold circuitry 308, example priority area identification circuitry 310, and/or an example data storage 312. The data receiver circuitry 304, the distance identification circuitry 306, the threshold circuitry 308, the priority area identification circuitry 310, and/or the data storage 312 are in communication using an example bus 314.

The data receiver circuitry 304 receives data input corresponding to the second image data set 110 (e.g., including the mask-based input data 104) of FIG. 1A. For example, the depth-based image can include the color-based input data 102 (e.g., $I_1$, $I_2$), the mask-based input data 104 (e.g., $M_1$, $M_2$), and/or the depth-based input data 106 (e.g., $D_1$, $D_2$). For purposes of performing mask processing and/or mask selection, the data receiver circuitry 304 obtains data corresponding to the mask-based input data 104 (e.g., $M_1$, $M_2$). 120

The distance identification circuitry 306 identifies a distance between a given pixel and a center of a patch (e.g., a center point of a mask map). For example, the mask selection circuitry 302 disclosed herein considers the position of camera(s) used to capture the depth-based image to ascertain that pixel(s) of better quality are selected if needed. In some examples, the mask selection circuitry 302 can identify left vs. right camera capture (e.g., when using a binocular RGB-D image capture setup), thereby allowing the positional information of the image to be represented based on a left-based camera position or a right-based camera position. In the example of FIG. 3, the distance identification circuitry 306 performs several morphological operations (e.g., an erode operation, a dilate operation, etc.) to remove the holes of the mask, in accordance with Equations 6 and 7, where $\mathcal{D}$ and $\mathcal{E}$ represent dilate and erode operations, respectively, and '$\odot$' denotes a Hadamard product:

$$V_i(x, y) = \begin{cases} 1, & M_i(x, y) > 0 \\ 0, & M_i(x, y) = 0 \end{cases} \qquad \text{Equation 6}$$

$$M_i' = \mathcal{D}(\mathcal{E}(V_i)) \odot M_i \qquad \text{Equation 7}$$

In some examples, the distance identification circuitry 306 can avoid performing dilation and/or erosion directly on mask maps to prevent loss of probability information from $M_i$. Once the dilate and/or erode operation(s) are complete, the distance identification circuitry 306 calculates the reliability of a pixel (x, y) in the mask map in accordance with Equation 8, where M (x, y) represents the value of the output mask at position (x, y), and h(x) is a function that represents the distance between the pixel and a border line corresponding to a border of an object captured in the texture image (e.g., RGB image) and/or depth-based image (e.g., RGB-D image):

$$Pr_{m,i}(x,y) = M_i'(x,y)h(x)g(x,y) \qquad \text{Equation 8}$$

In the example of Equation 8, h(x) represents the distance between the pixel and the border line, and can be further defined in accordance with Equation 9, where od represents a parameter set for the Gaussian procedure (e.g., as represented by gaussian-based processing 124 of FIG. 1A), and $x_{min}$ and $x_{max}$ are the minimum and maximum x coordinates, respectively:

$$h(x) = \begin{cases} \exp\left(-\dfrac{x - x_{min}}{(x_{max} - x_{min})\sigma_d}\right), & \text{if camera is on the left} \\ \exp\left(-\dfrac{x_{max} - x}{(x_{max} - x_{min})\sigma_d}\right), & \text{if camera is on the right} \end{cases} \qquad \text{Equation 9}$$

In some examples, the left camera captures more accurate and/or noiseless (e.g., artifact-free) depth information in the left area (e.g., closer to the left-based camera) while the right camera captures more accurate and/or noiseless (e.g., artifact-free) information in the right area (e.g., closer to the right-based camera). Therefore, it is useful to differentiate between pixel accuracy based on initial camera positioning during the depth-based image capture. Once the distance between a given pixel and the border line can be determined, the distance identification circuitry 306 identifies the distance between the pixel and the center of the area of interest in accordance with Equation 10 using a Gaussian function g(x, y), where $\sigma_g$ represents a parameter set for the Gaussian procedure and ($x_{i,c}$, $y_{i,c}$) is the center of the mask map:

$$g(x, y) = \exp\left(-\frac{(x - x_{i,c})^2 + (y - y_{i,c})^2}{2\sigma_g^2}\right) \qquad \text{Equation 10}$$

Likewise, the center of the mask map ($x_{i,c}$, $y_{i,c}$) can be determined in accordance with Equation 11, where $Th_x$ and $Th_y$ are x- and y-based thresholds, respectively:

$$x_{i,c} = \text{Median}_{M_i'(x,y)>Th_x} x, \quad y_{i,c} = \text{Median}_{M_i'(x,y)>Th_y} y \qquad \text{Equation 11}$$

The threshold circuitry 308 determines the adjusted mask output (e.g., $M_i^1(x, y)$) as determined using the distance identification circuitry 306. In some examples, the threshold circuitry 308 uses a threshold $Th_p$ to make the mask binary in accordance with Equation 12:

$$M_i^1(x, y) = \begin{cases} 1, & Pr_m(x, y) > Th_p \\ 0, & Pr_m(x, y) \le Th_p \end{cases} \qquad \text{Equation 12}$$

As such, the thresholding permits the identification of areas of the mask that should have zero values versus areas of the map that should have non-zero values.

The priority area identification circuitry 310 determines which positions of the depth map are important and/or should be maintained regardless of the pixel value. For example, the priority area identification circuitry 310 identifies which positions of the depth map are important and can be used regardless of the pixel value. As such, the priority area identification circuitry 310 can be used to refine mask maps (e.g., mask-based input data 104) by addressing the original lack of positional preference. In some examples, the priority area identification circuitry 310 receives input from the threshold circuitry 308 to determine the final mask map output (e.g., adjusted mask map 132 of FIG. 1A). For example, the priority area identification circuitry 310 outputs the final adjusted mask map as determined using the mask selection circuitry 302 to improve mask quality by identifying the mask map center point (e.g., which is assumed to be more precise and important than area(s) that are farther away from the center point) and relying on image positioning (e.g., left- or right-hand based directional importance based on camera positioning). The priority area identification circuitry 310 thereby outputs the adjusted mask map, which can be represented as $M_1{}^1$, $M_2{}^1$ in the example of FIG. 1A. For example, the priority area identification circuitry 310 outputs an adjusted mask map associated with the input depth image based on a position of at least one camera used to capture the image.

The data storage 312 can be used to store any information associated with the data receiver circuitry 304, the distance identification circuitry 306, the threshold circuitry 308, and/or the priority area identification circuitry 310. The example data storage 312 of the illustrated example of FIG. 3 can be implemented by any memory, storage device and/or storage disc for storing data such as flash memory, magnetic media, optical media, etc. Furthermore, the data stored in the example data storage 312 can be in any data format such as binary data, comma delimited data, tab delimited data, structured query language (SQL) structures, image data, etc.

Figure 4:
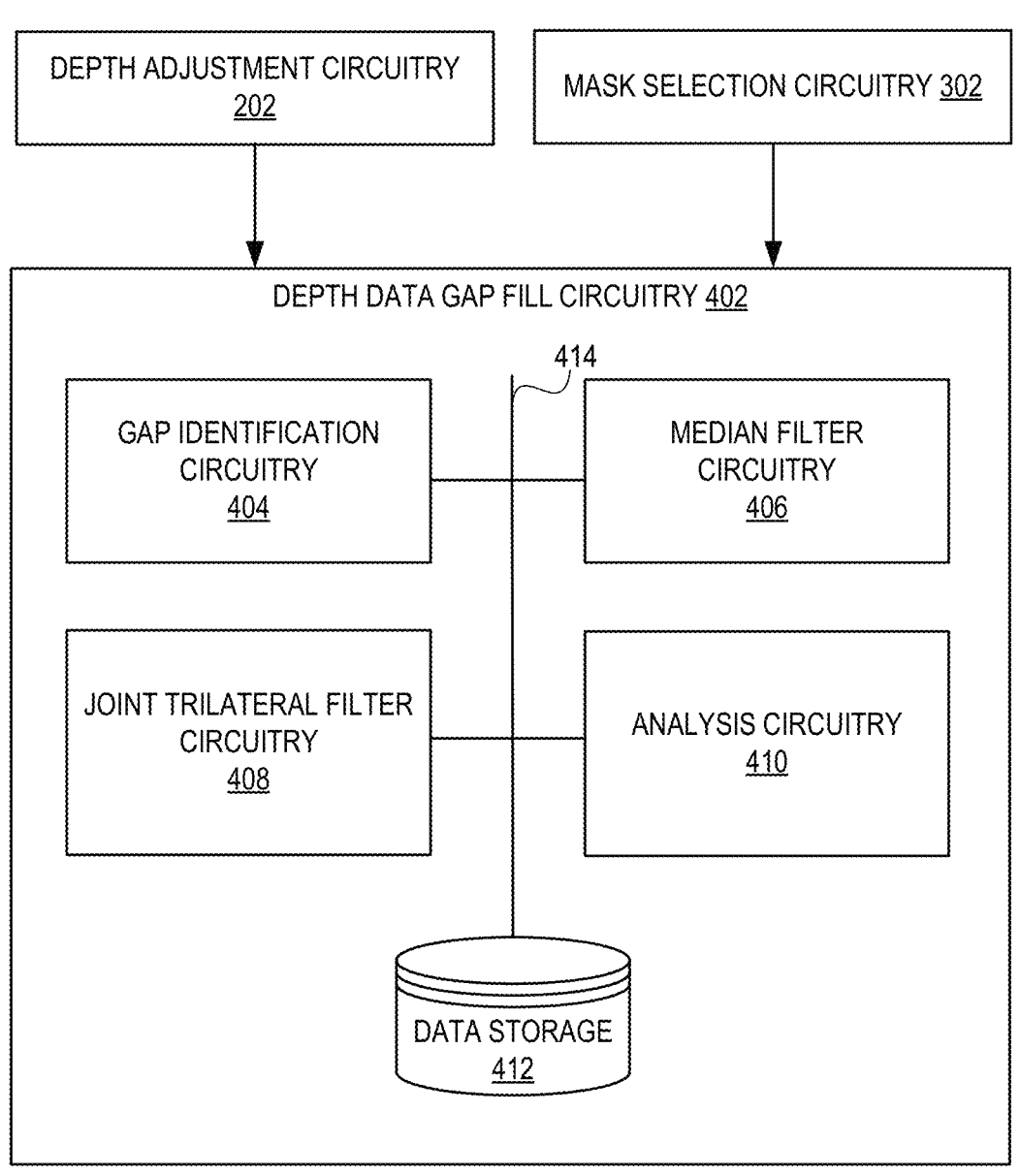
FIG. 4 illustrates a block diagram of example depth data gap fill circuitry constructed in accordance with teachings of this disclosure for performing the depth data gap filling process of FIG. 1B.

FIG. 4 illustrates a block diagram of example depth data gap fill circuitry 402 constructed in accordance with teachings of this disclosure for performing the depth data gap filling algorithm 140 of FIG. 1B. In FIG. 4, the depth data gap fill circuitry 402 includes example gap identification circuitry 404, example median filter circuitry 406, example joint trilateral filter circuitry 408, example analysis circuitry 410, and/or an example data storage 412. The gap identification circuitry 404, the median filter circuitry 406, the joint trilateral filter circuitry 408, the analysis circuitry 410, and/or the data storage 412 are in communication using an example bus 414.

The gap identification circuitry 404 receives the adjusted depth map 128 (e.g., $$D_1^1, D_2^1$$

the adjusted mask map 132 (e.g., $$M_1^1, M_2^1$$

and the original color-based input data 102 (e.g., $I_1$, $I_2$), as shown in connection with FIG. 1A. In the example of FIG. 4, the gap identification circuitry 404 identifies data gaps as part of filling depth values for pixels that are missing in the adjusted depth map 128 (e.g., $$D_1^1, D_2^1$$

but are identified as present in the adjusted mask map 132 (e.g., $$M_1^1, M_2^1.$$

In some examples, the depth data gap fill circuitry 402 relies on the assessment that pixels that are spatially close with each other tend to have similar depth values and the pixels that are close in color should also have similar depth values. In the example of FIG. 4, the gap identification circuitry 404 receives an un-filled depth map $$D_i^1$$

and a mask map $$M_i^1$$

In general, the depth data gap fill circuitry 402 fills depth values for pixels that satisfy $$D_i^1(x, y) = 0 \text{ and } M_i^1 = 1,$$

such that a given pixel location having a zero depth value also has a mask map value equal to one at the same pixel location, indicating that there should be a corresponding non-zero depth value at that location. For example, owing to a lack of information or inaccurate mask positions, depth values of some of the pixels can be too ambiguous to determine and filling in forcefully (e.g., directly interpolating a pixel without any depth value information) can lead to increased inaccuracies. In some examples, missing depth values can appear at edge areas where depth values change sharply. Directly interpolating in this area can generate a smooth 'transitional zone' between two significantly different depth edges and cause severe artifacts. As such, the median filter circuitry 406 and/or the joint trilateral filter circuitry 408 can be used to perform the data gap filling.

The median filter circuitry 406 uses a median filter for filtering of the valid pixels around the depth data gap (e.g., hole) with a threshold constraint. For example, given a neighboring depth patch of a pixel (x, y) is represented as $$P_{i,x,y}^{depth}$$

and the color patch is represented as $$P_{i,x,y}^{color}, D_i^1(x, y)$$

can be represented in accordance with Equation 13 shown below:

Equation 13

$$\forall\,(x,\,y) \in E_i,\, D_i^1(x,\,y) = $$
$$\begin{cases} \text{median}(P_{i,x,y}^{depth}), & N(P_{i,x,y}^{depth} > 0 \text{ and } \|P_{i,x,y}^{color} - I_i(x,\,y)\|^2 < Th_{color}) > Th_{median} \\ 0, & N(P_{i,x,y}^{depth} > 0 \text{ and } \|P_{i,x,y}^{color} - I_i(x,\,y)\|^2 < Th_{color}) \leq Th_{median} \end{cases}$$

In the example of Equation 13 (above), $E_i$ represents the area that needs to be filled. As such, for all pixel locations defined by (x, y) that are part of the area that needs to be filled ($E_i$), the depth pixel values can be identified with a non-zero value or a zero value. For example, for all instances of the neighboring depth patch of a pixel having a non-zero value (e.g., $$P_{i,x,y}^{depth} > 0)$$

and the squared norm value of the pixel color patch value minus the center color pixel value being less than a set threshold value (e.g., $$\|P_{i,x,y}^{color} - I_i(x,\,y)\|^2 < Th_{color}),$$

the depth map pixel value is set to the median of the pixel depth patch value for all instances of $$N(P_{i,x,y}^{depth} > 0 \text{ and } \|P_{i,x,y}^{color} - I_i(x,\,y)\|^2 < Th_{color})$$

being greater than the set median threshold (e.g., $>Th_{median}$), whereas all instances less than or equal to the median threshold (e.g., $>Th_{median}$) result in a zero value for the depth pixel values at $$D_i^1(x,\,y)$$

For example, Equation 14 further defines the area that needs to be filled as:

$$E_i = \{(x,\,y)\,|\,D_i^1(x,\,y) = 0 \text{ and } M_i^1(x,\,y) = 1\} \qquad \text{Equation 14}$$

As such, the depth data gap fill circuitry 402 fills depth values for pixels that satisfy $$D_i^1(x,\,y) = 0$$

and $$M_i^1 = 1,$$

such that the mask $$M_i^1(x,\,y)$$

is used to identify which depth values require filling to complete the depth map $$D_i^1(x,\,y)$$

The joint trilateral filter circuitry 408 adds another depth constraint to the original joint bilateral filtering kernel. In some examples, the joint trilateral filter circuitry 408 applies additional filtering if a given pixel is assigned with a non-zero value in the previous rough estimation step performed using the median filter circuitry 406. In some examples, the joint trilateral filter circuitry 408 defines the joint trilateral filter in accordance with Equation 15 (shown below):

$$D_i^*(x,\,y) = \begin{cases} \dfrac{1}{zw} \displaystyle\sum_{(x',y') \in E_i'} w_{x',y'} D_i^1(x',\,y'), & zw > Th_{zw} \\ 0, & zw \leq Th_{zw} \end{cases} \qquad \text{Equation 15}$$

Using a regularization term (e.g., $zw = \Sigma_{(x',y') \in E_i'}(W_{x',y'})$, the joint trilateral filter circuitry 408 sets a threshold $Th_{zw}$ to eliminate points with low reliability. In the example of Equation 15, $$E_i'$$

represents pixel(s) with eligible depth values in the patch $$P_{i,x,y}^{trilateral}.$$

For example, $$E_i'$$

can be further defined in accordance with Equation 16:

$$E_i' = \{(x',\,y')\,|\,(x',\,y') \in P_{i,x,y}^{trilateral} \text{ and } D_i^1(x',\,y') \neq 0\} \qquad \text{Equation 16}$$

Furthermore, the joint trilateral filter circuitry 408 determines a trilateral weight $W_{x',y'}$ based on three constraints, as shown in connection with Equation 17, where $w_{color}$ is a color constraint, $w_{distance}$ is a distance constraint, and $w_{depth}$ is a depth constraint:

$$w_{x',y'} = w_{color} \times w_{distance} \times w_{depth} \qquad \text{Equation 17}$$

In some examples, the joint trilateral filter circuitry 408 defines the color constraint ($w_{color}$), the distance constraint ($w_{distance}$), and/or the depth constraint ($w_{depth}$) in accordance with Equations 18, 19, and 20, respectively:

$$w_{color} = \exp\left(-\frac{\|I_i(x',y') - I_i(x,y)\|^2}{2\sigma_{color}^2}\right) \qquad \text{Equation 18}$$

$$w_{distance} = \exp\left(-\frac{(x'-x)^2 + (y'-y)^2}{2\sigma_{distance}^2}\right) \qquad \text{Equation 19}$$

$$w_{depth} = \exp\left(-\frac{\|D_i^*(x',y') - D_i^*(x,y)\|^2}{2\sigma_{depth}^2}\right) \qquad \text{Equation 20}$$

In the example of Equation 18, $l_2$ represents a norm of the color difference. In the example of Equation 19, $w_{distance}$ is determined using a similar Gaussian kernel as used in the determination of the color constraint. In the example of Equation 20, $w_{depth}$ is based on a rough estimation used as an anchor point with additional robustness added to the algorithm. In Equations 18-20, the Gaussian-based distribution parameters $\sigma_{color}$, $\sigma_{distance}$ and $\sigma_{depth}$ are used for obtaining a filter weight for the color constraint ($w_{color}$), the distance constraint ($w_{distance}$), and/or the depth constraint ($w_{depth}$), respectively. As such, the smaller the value for the Gaussian-based distribution parameters, the greater the weight of each of the color constraint, distance constraint, and/or depth constraint. Based on these equations, the depth data gap fill circuitry 402 results in updated depth map(s) 150, 152 (e.g., $D_1^*$, $D_2^*$) as determined using Equation 15 and shown in connection with FIG. 1B. As such, the depth data gap fill circuitry 402 uses the joint trilateral filter circuitry 408 to perform iterative depth data gap filling based on the adjusted depth map and the adjusted mask map to obtain an adjusted depth image corresponding to the input depth image.

The analysis circuitry 410 performs depth gap filling analysis on example datasets (e.g., a Kinect-like synthesized dataset revised based on a Middlebury dataset, including depth-based image pairs with Kinect-like degraded synthesized depth as input and original depth as ground truth). In some examples, the analysis circuitry 410 uses mean absolute difference (MAD) values as a metric of depth gap filling using the depth data gap fill circuitry 402. For example, a lower MAD signifies better quality of the resulting depth maps (e.g., $D_1^*$, $D_2^*$), as shown in connection with FIGS. 9, 10, 11.

The data storage 412 can be used to store any information associated with the gap identification circuitry 404, the median filter circuitry 406, the joint trilateral filter circuitry 408, and/or the analysis circuitry 410. The example data storage 412 of the illustrated example of FIG. 4 can be implemented by any memory, storage device and/or storage disc for storing data such as flash memory, magnetic media, optical media, etc. Furthermore, the data stored in the example data storage 412 can be in any data format such as binary data, comma delimited data, tab delimited data, structured query language (SQL) structures, image data, etc.

In some examples, the apparatus includes means for identifying a color patch and a depth patch for an image pixel in a border area of the image frame. For example, the means for identifying a color patch and a depth patch may be implemented by patch identification circuitry 204. In some examples, the patch identification circuitry 204 may be implemented by machine executable instructions such as that implemented by at least blocks 605, 610 of FIG. 6 executed by processor circuitry, which may be implemented by the example processor circuitry 1212 of FIG. 12, the example processor circuitry 1500 of FIG. 15, and/or the example Field Programmable Gate Array (FPGA) circuitry 1600 of FIG. 16. In other examples, the patch identification circuitry 204 is implemented by other hardware logic circuitry, hardware implemented state machines, and/or any other combination of hardware, software, and/or firmware. For example, the patch identification circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for outputting an adjusted depth map. For example, the means for outputting an adjusted depth map may be implemented by depth value removal circuitry 210. In some examples, the depth value removal circuitry 210 may be implemented by machine executable instructions such as that implemented by at least blocks 630, 635 of FIG. 6 executed by processor circuitry, which may be implemented by the example processor circuitry 1212 of FIG. 12, the example processor circuitry 1500 of FIG. 15, and/or the example Field Programmable Gate Array (FPGA) circuitry 1600 of FIG. 16. In other examples, the depth value removal circuitry 210 is implemented by other hardware logic circuitry, hardware implemented state machines, and/or any other combination of hardware, software, and/or firmware. For example, the depth value removal circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for outputting an adjusted mask map. For example, the means for outputting an adjusted mask map may be implemented by priority area identification circuitry 310. In some examples, the priority area identification circuitry 310 may be implemented by machine executable instructions such as that implemented by at least blocks 725, 730 of FIG. 7 executed by processor circuitry, which may be implemented by the example processor circuitry 1312 of FIG. 13, the example processor circuitry 1500 of FIG. 15, and/or the example Field Programmable Gate Array (FPGA) circuitry 1600 of FIG. 16. In other examples, the priority area identification circuitry 310 is implemented by other hardware logic circuitry, hardware implemented state machines, and/or any other combination of hardware, software, and/or firmware. For example, the priority area identification circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for performing iterative depth data gap filling. For example, the means for performing iterative depth data gap filling may be implemented by joint trilateral filter circuitry 408. In some examples, the joint trilateral filter circuitry 408 may be implemented by machine executable instructions such as that implemented by at least blocks 815, 820 of FIG. 8 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the joint trilateral filter circuitry 408 is implemented by other hardware logic circuitry, hardware implemented state machines, and/or any other combination of hardware, software, and/or firmware. For example, the joint trilateral filter circuitry 408 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the depth adjustment circuitry 202 is illustrated in FIG. 2, one or more of the elements, processes, and/or devices illustrated in FIG. 2 may be combined, divided, re-arranged, omitted, eliminated, and/or implemented in any other way. Further, the example patch identification circuitry 204, the example pixel comparison circuitry 206, the example threshold identification circuitry 208, the example depth value removal circuitry 210, and/or, more generally, the example depth adjustment circuitry 202 of FIG. 2, may be implemented by hardware, software, firmware, and/or any combination of hardware, software, and/or firmware. Thus, for example, any of the patch identification circuitry 204, the example pixel comparison circuitry 206, the example threshold identification circuitry 208, the example depth value removal circuitry 210, and/or, more generally, the example depth adjustment circuitry 202 of FIG. 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the patch identification circuitry 204, the example pixel comparison circuitry 206, the example threshold identification circuitry 208, the example depth value removal circuitry 210, and/or, more generally, the example depth adjustment circuitry 202 of FIG. 2 is/are hereby expressly defined to include a non-transitory computer readable storage device or storage disk such as a memory, a digital versatile disk (DVD), a compact disk (CD), a Blu-ray disk, etc., including the software and/or firmware. Further still, the example depth adjustment circuitry 202 of FIG. 2 may include one or more elements, processes, and/or devices in addition to, or instead of, those illustrated in FIG. 2, and/or may include more than one of any or all of the illustrated elements, processes and devices.

While an example manner of implementing the mask selection circuitry 302 is illustrated in FIG. 3, one or more of the elements, processes, and/or devices illustrated in FIG. 3 may be combined, divided, re-arranged, omitted, eliminated, and/or implemented in any other way. Further, the example data receiver circuitry 304, the example distance identification circuitry 306, the example threshold circuitry 308, the example priority area identification circuitry 310, and/or, more generally, the example mask selection circuitry 302 of FIG. 3, may be implemented by hardware, software, firmware, and/or any combination of hardware, software, and/or firmware. Thus, for example, any of the example data receiver circuitry 304, the example distance identification circuitry 306, the example threshold circuitry 308, the example priority area identification circuitry 310, and/or, more generally, the example mask selection circuitry 302 of FIG. 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example data receiver circuitry 304, the example distance identification circuitry 306, the example threshold circuitry 308, the example priority area identification circuitry 310, and/or, more generally, the example mask selection circuitry 302 of FIG. 3 is/are hereby expressly defined to include a non-transitory computer readable storage device or storage disk such as a memory, a digital versatile disk (DVD), a compact disk (CD), a Blu-ray disk, etc., including the software and/or firmware. Further still, the example mask selection circuitry 302 of FIG. 3 may include one or more elements, processes, and/or devices in addition to, or instead of, those illustrated in FIG. 3, and/or may include more than one of any or all of the illustrated elements, processes and devices.

While an example manner of implementing the depth data gap fill circuitry 402 is illustrated in FIG. 4, one or more of the elements, processes, and/or devices illustrated in FIG. 4 may be combined, divided, re-arranged, omitted, eliminated, and/or implemented in any other way. Further, the example gap identification circuitry 404, the example median filter circuitry 406, the example joint trilateral filter circuitry 408, the example analysis circuitry 410, and/or, more generally, the example depth data gap fill circuitry 402, may be implemented by hardware, software, firmware, and/or any combination of hardware, software, and/or firmware. Thus, for example, any of the example gap identification circuitry 404, the example median filter circuitry 406, the example joint trilateral filter circuitry 408, the example analysis circuitry 410, and/or, more generally, the example depth data gap fill circuitry 402 of FIG. 4, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example gap identification circuitry 404, the example median filter circuitry 406, the example joint trilateral filter circuitry 408, the example analysis circuitry 410, and/or, more generally, the example depth data gap fill circuitry 402 of FIG. 4 is/are hereby expressly defined to include a non-transitory computer readable storage device or storage disk such as a memory, a digital versatile disk (DVD), a compact disk (CD), a Blu-ray disk, etc., including the software and/or firmware. Further still, the example depth data gap fill circuitry 402 of FIG. 4 may include one or more elements, processes, and/or devices in addition to, or instead of, those illustrated in FIG. 4, and/or may include more than one of any or all of the illustrated elements, processes and devices.

Figure 5:
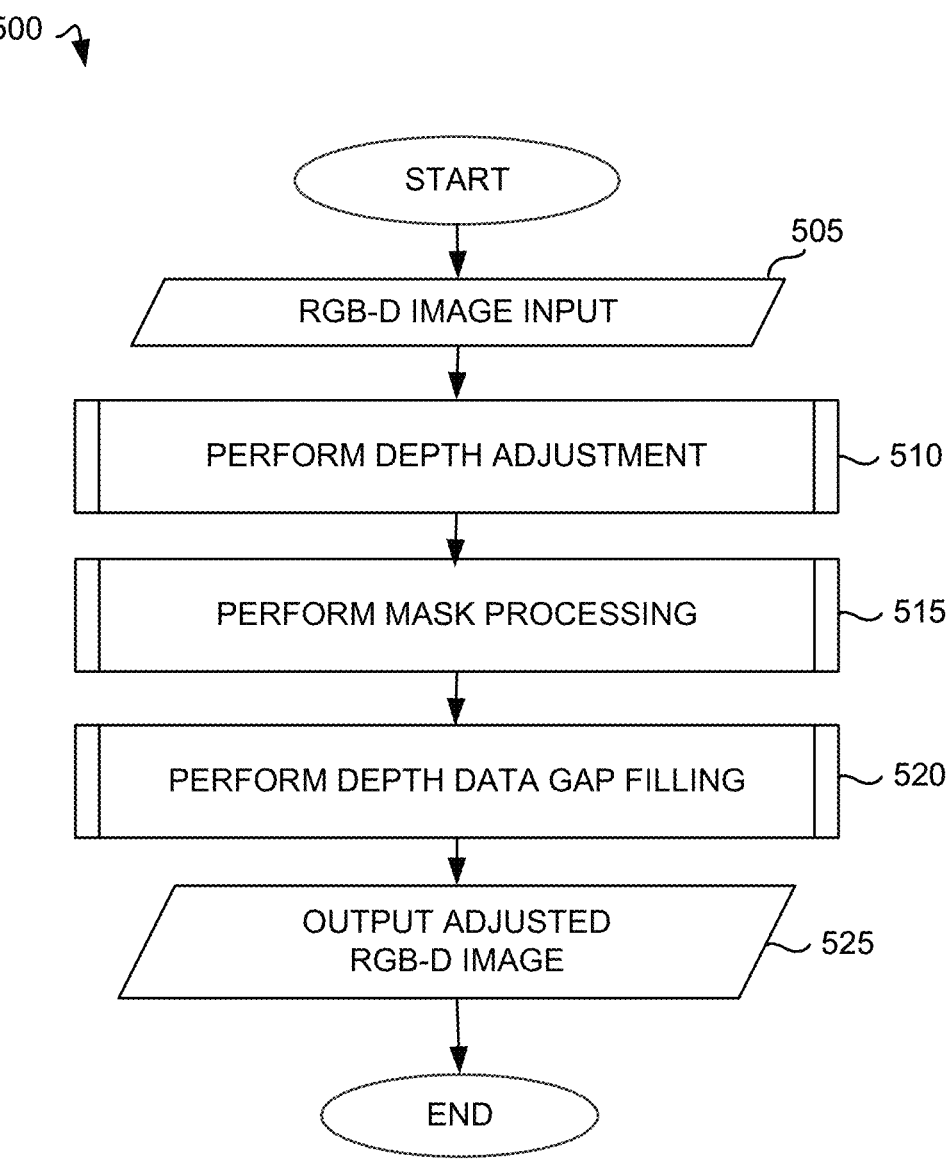
FIG. 5 is a flowchart representative of example machine readable instructions that may be executed by example processor circuitry to implement the depth adjustment circuitry of FIG. 2, the mask selection circuitry of FIG. 3, and/or the data gap filling circuitry of FIG. 4.

Flowcharts representative of example hardware logic circuitry, machine readable instructions, hardware implemented state machines, and/or any combination thereof for implementing the depth adjustment circuitry 202 of FIG. 2 are shown in FIGS. 5 and/or 6. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 15 and/or 16. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 5, 6, many other methods of implementing the example depth adjustment circuitry 202 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 7:
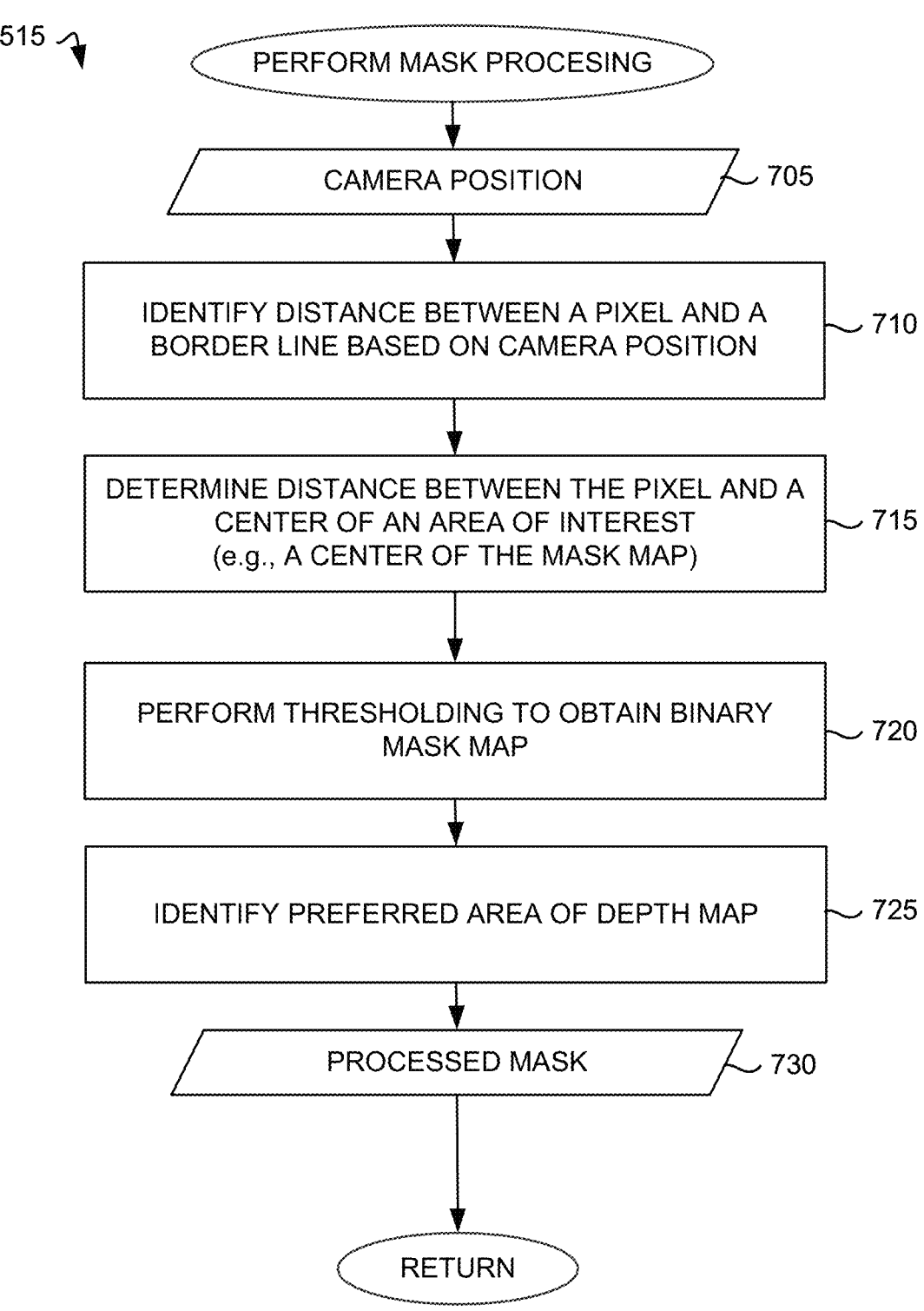
FIG. 7 is a flowchart representative of example machine readable instructions that may be executed by example processor circuitry to implement the mask selection circuitry of FIG. 3.

Flowcharts representative of example hardware logic circuitry, machine readable instructions, hardware implemented state machines, and/or any combination thereof for implementing the mask selection circuitry 302 of FIG. 3 are shown in FIGS. 5, 7. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 15 and/or 16. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 5, 7, many other methods of implementing the mask selection circuitry 302 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 8:
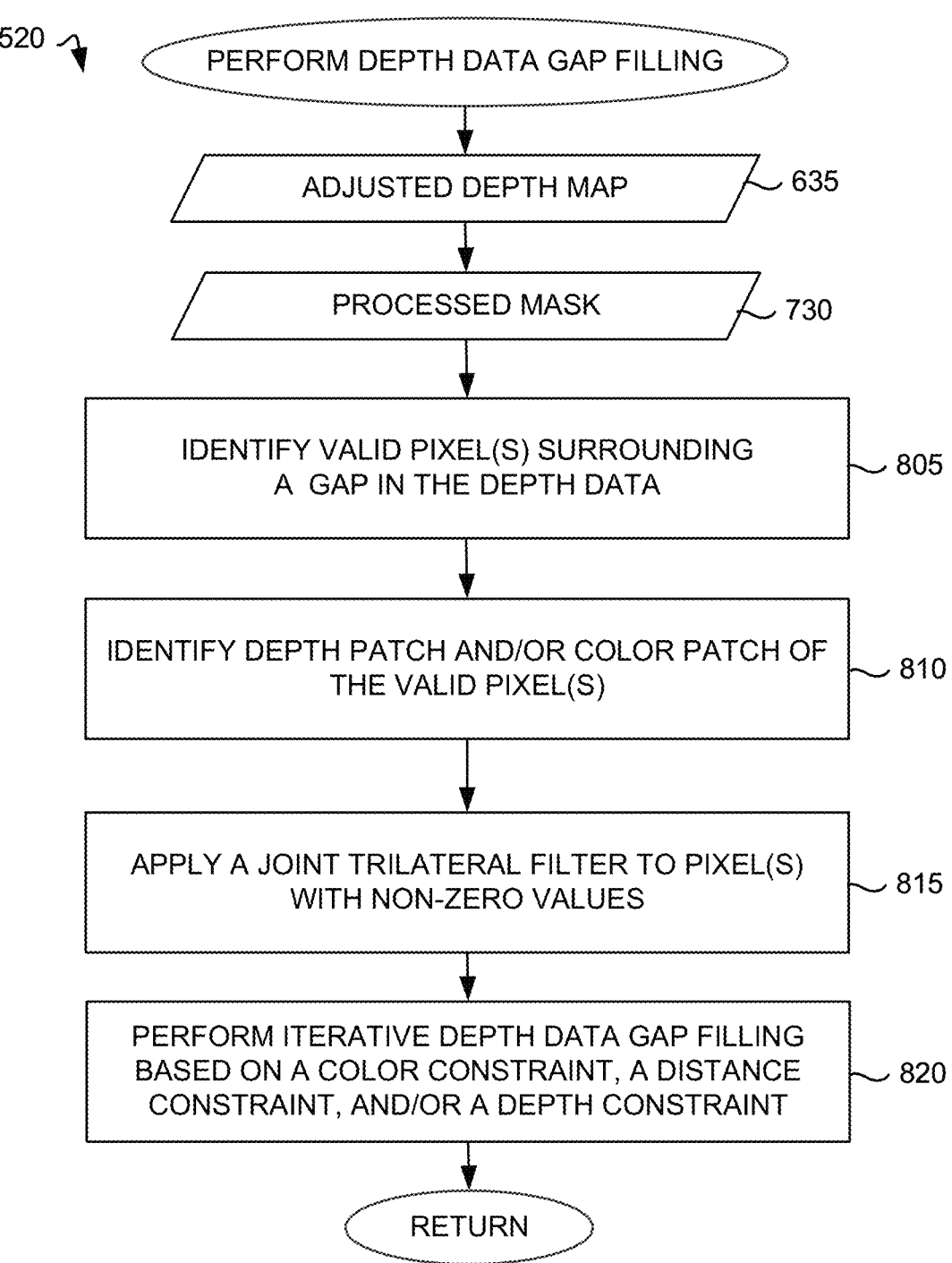
FIG. 8 is a flowchart representative of example machine readable instructions that may be executed by example processor circuitry to implement the depth data gap fill circuitry of FIG. 4.

Flowcharts representative of example hardware logic circuitry, machine readable instructions, hardware implemented state machines, and/or any combination thereof for implementing the depth data gap fill circuitry 402 of FIG. 4 are shown in FIGS. 5, 8. The machine readable instructions may be one or more executable programs or portion(s) of an executable program for execution by processor circuitry, such as the processor circuitry 1412 shown in the example processor platform 1400 discussed below in connection with FIG. 14 and/or the example processor circuitry discussed below in connection with FIGS. 15 and/or 16. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 5, 8, many other methods of implementing the depth data gap fill circuitry 402 of FIG. 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions 500 that may be executed by example processor circuitry to implement the depth adjustment circuitry 202 of FIG. 2, the mask selection circuitry 302 of FIG. 3, and/or the data gap fill circuitry 402 of FIG. 4. In the example of FIG. 5, the depth adjustment circuitry 202 receives depth-based image input (e.g., an RGB-D image including color-based input data 102 (e.g., $I_1$, $I_2$) mask-based input data 104 (e.g., $M_1$, $M_2$), and/or depth-based input data 106 (e.g., $D_1$, $D_2$) of FIG. 1A) (block 505). While in the example of FIG. 5 processing of the depth-based image begins with the depth adjustment circuitry 202 of FIG. 2 to perform depth adjustment (block 510) and proceeds to the mask selection circuitry 302 of FIG. 3 to perform mask processing (block 515), either of the depth adjustment circuitry 202 or the mask selection circuitry 302 can initiate the depth-based image processing. In some examples, depth-based image processing using the depth adjustment circuitry 202 and/or the mask selection circuitry 302 can proceed simultaneously and/or in any other order. For example, the depth adjustment circuitry 202 identifies inaccurate depth values based on a mismatch of border(s) in a color image versus a depth image. Once the depth adjustment has been performed, the depth adjustment circuitry 202 outputs the adjusted depth map 128 of FIG. 1A. The mask selection circuitry 302 improves mask quality by identifying the mask map center point (e.g., which is assumed to be more precise and important than area(s) that are farther away from the center point) and relying on image positioning (e.g., left- or right-hand based directional importance based on camera positioning). The mask selection circuitry 302 outputs the adjusted mask map 132 of FIG. 1A. In the example of FIG. 5, once the depth adjustment circuitry 202 and/or the mask selection circuitry 302 have completed depth adjustment (block 510), as described in connection with FIG. 5 and/or mask processing (block 515), as described in connection with FIG. 6, the depth data gap fill circuitry 402 proceeds with performing depth data gap filling (block 520), as described in connection with FIG. 8. The depth data gap fill circuitry 402 receives the adjusted depth map 128 and/or the adjusted mask map 132. The depth data gap fill circuitry 402 performs the filling of gaps in the received adjusted depth map 128 based on the adjusted mask map 132 using a valid median filter and/or a joint trilateral filter as described in connection with FIG. 8. Once the depth data gap filling is complete, the depth data gap fill circuitry 402 outputs an adjusted depth-based image based on the adjusted depth maps 150, 152 of FIG. 1B. As such, the quality of the depth-based image is improved and can be used in further applications for 3D reconstruction, free view generation, and/or any other applications resulting from the use of multi-view systems.

FIG. 6 is a flowchart representative of example machine readable instructions 510 that may be executed by example processor circuitry to implement the depth adjustment circuitry 202 of FIG. 2. In the example of FIG. 6, the patch identification circuitry 204 identifies a border area for a given set of pixels corresponding to a depth-based image of interest (block 605). For example, correcting the wrong depth values within the border area(s) can be useful given that most wrong depth values are around object borders. Once the borders are identified, the pixel comparison circuitry 206 identifies inaccurate depth values based on a mismatch of border(s) in a color image versus a depth image. For example, the patch identification circuitry 204 detects a depth patch (e.g., pixel-based depth processing 114 of FIG. 1A) and/or a color patch (e.g., pixel-based color processing 116 of FIG. 1A) for each pixel using the color image (e.g., $I_1$, $I_2$) and/or the depth image (e.g., $D_1$, $D_2$) (block 610). The pixel comparison circuitry 206 then compares the other pixel(s) in the color patch and/or depth patch using a center color and/or depth value (block 615). In some examples, the pixel comparison circuitry 206 identifies a mismatch between the center color (e.g., $I_i(x, y)$) and depth value (e.g., $D_i(x, y)$) and the pixel in the given color patch and in the given depth patch, as described in connection with FIG. 2 (block 620). For example, a potential mismatch is confirmed using the threshold identification circuitry 208. For example, the threshold identification circuitry 208 determines whether the identified mismatch meets and/or exceeds a set threshold (block 625). For example, the pixel comparison circuitry 206 identifies a mismatch area ratio and the threshold identification circuitry 208 identifies whether the mismatch area ratio achieves a set mismatch threshold. If the threshold is met or exceeded, the threshold identification circuitry 208 confirms that a mismatch exists (block 625). If the threshold is not met, the threshold identification circuitry 208 confirms that a mismatch does not exit, and control proceeds to the mask selection circuitry 302 (block 515 of FIG. 5). Given an existing mismatch, the depth value removal circuitry 210 adjusts the depth map to correct for the identified mismatch by removing inaccurate depth value(s) (block 630). For example, given that depth values captured by sensors can include wrong depth value(s) and/or missing pixel(s), such values can be removed and/or adjusted using the depth value removal circuitry 210. In some examples, such data flaws are caused by physical properties of the depth sensor, low resolutions and/or multi-camera interference(s). Since the flaws are more obvious along borders of objects because of the uncertain orientations of the object surfaces near the border, the border area(s) are identified to be used for guiding the correction of the wrong depth value(s) within them using the patch identification circuitry 204 as described above. Once the depth value removal circuitry 210 completes the depth map adjustment, the depth adjustment circuitry 202 outputs the adjusted depth map (block 635).

FIG. 7 is a flowchart representative of example machine readable instructions 515 that may be executed by example processor circuitry to implement the mask selection circuitry 302 of FIG. 3. In the example of FIG. 7, the mask selection circuitry 302 receives an input camera position given that different camera positions alter the preferred area of a depth map (block 705). As such, the mask selection circuitry 302 uses the input camera position to improve depth map quality. For example, the data receiver circuitry 304 receives the input camera position and the mask-based input data 104 (e.g., $M_1$, $M_2$) of FIG. 1A. In some examples, the distance identification circuitry 306 identifies a distance between a pixel and a border line of a given pixel patch based on the camera position (block 710). For example, the distance identification circuitry 306 identifies the distance between the pixel and the border line based on camera positioning (e.g., left camera positioning vs. right camera positioning). The distance identification circuitry 306 further identifies a distance between a given pixel and a center of an area of interest (e.g., a center of the mask map) (block 715). In some examples, the distance identification circuitry 306 identifies the distance of the pixel from the center of the mask map given that an area around the center point is assumed to be more precise and important than areas that are far from the center point. Threshold circuitry 308 performs thresholding to obtain a binary mask map, such that mask-based pixels that are above a set threshold are given a value of 1, whereas mask-based pixels that are below or equivalent to the set threshold are given a value of 0. Subsequently, the priority area identification circuitry 310 identifies the preferred area of the depth map based on the thresholding performed by the threshold circuitry 308 (block 725). For example, the priority area identification circuitry 310 outputs the processed mask (block 730) such that the mask has any identified gaps removed (e.g., using erode and/or delate operations as described in connection with FIG. 3), with the positional information of the texture image adjusted based on camera positioning.

FIG. 8 is a flowchart representative of example machine readable instructions 520 that may be executed by example processor circuitry to implement the depth data gap fill circuitry 402 of FIG. 4. In the example of FIG. 8, the depth data gap fill circuitry 402 receives adjusted depth map input (e.g., the adjusted depth map 128 of FIG. 1B represented as $D_1^1$, $D_2^1$) (block 635 of FIG. 6). Likewise, the depth data gap fill circuitry 402 receives processed mask input (e.g., the adjusted mask map 132 of FIG. 1B represented as $M_1^1$, $M_2^1$) (block 730 of FIG. 7). In some examples, the gap identification circuitry 404 identifies valid pixel(s) surrounding a gap in the depth data (block 805). For example, the gap identification circuitry 404 identifies which pixels of a depth map have a value of zero and a corresponding value of one for the mask map. In some examples, the gap filling circuitry 402 includes median filter circuitry 406 to identify a depth patch and/or a color patch of the valid pixel(s) identified using the gap identification circuitry 404 (block 810). For example, the median filter circuitry 406 uses a median filter of the valid pixels around a given gap based on a neighboring depth patch of a pixel and/or a neighboring color patch of the pixel. The joint trilateral circuitry 408 then applies joint trilateral filter to pixel(s) with non-zero values (block 815). For example, the joint trilateral circuitry 408 identifies a color constraint, a distance constraint, and/or a depth constraint, as described in connection with FIG. 4. These constraints are used by the joint trilateral circuitry 408 to perform iterative depth data gap filling until the depth data gaps are filled (e.g., depth data zero pixel values that have a corresponding mask map pixel value of 1 are adjusted to a non-zero value based on the color constraint, the distance constraint, and/or the depth constraint) (block 820). In some examples, the joint trilateral circuitry 408 includes a threshold to eliminate pixel values with low reliability (e.g., based on depth map values). In some examples, analysis circuitry 410 of FIG. 4 can be used to perform depth data gap filling training to assess performance of the depth data gap fill circuitry 402 on various input depth-based images, as shown in connection with FIGS. 9, 10, 11.

Figure 9:
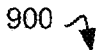
FIG. 9 illustrates example results obtained when assessing depth data gap filling using the depth data gap fill circuitry of FIG. 4.

FIG. 9 illustrates example results 900 obtained when assessing depth data gap filling using the depth data gap fill circuitry 402 of FIG. 4. In the example of FIG. 9, example prior algorithms 905, 910, 915, 920, 925, 930 were used to compare depth data gap filling performance with respect to the depth data gap fill circuitry 402 algorithm disclosed herein (e.g., corresponding to example disclosed algorithm 935 in FIG. 9). For example, a variety of depth-based image data inputs 940, 945, 950, 955, 960, 965 were used to identify a mean absolute difference result, with a lower value indicating improved quality of the output depth map (e.g., reduced number of depth gaps in the final output). As such, the disclosed algorithm 935 performed at an optimized gap filling capacity compared to the prior algorithms 905, 910, 915, 920, 925, 930, as can be further seen in the examples of FIGS. 10 and 11.

Figure 10:
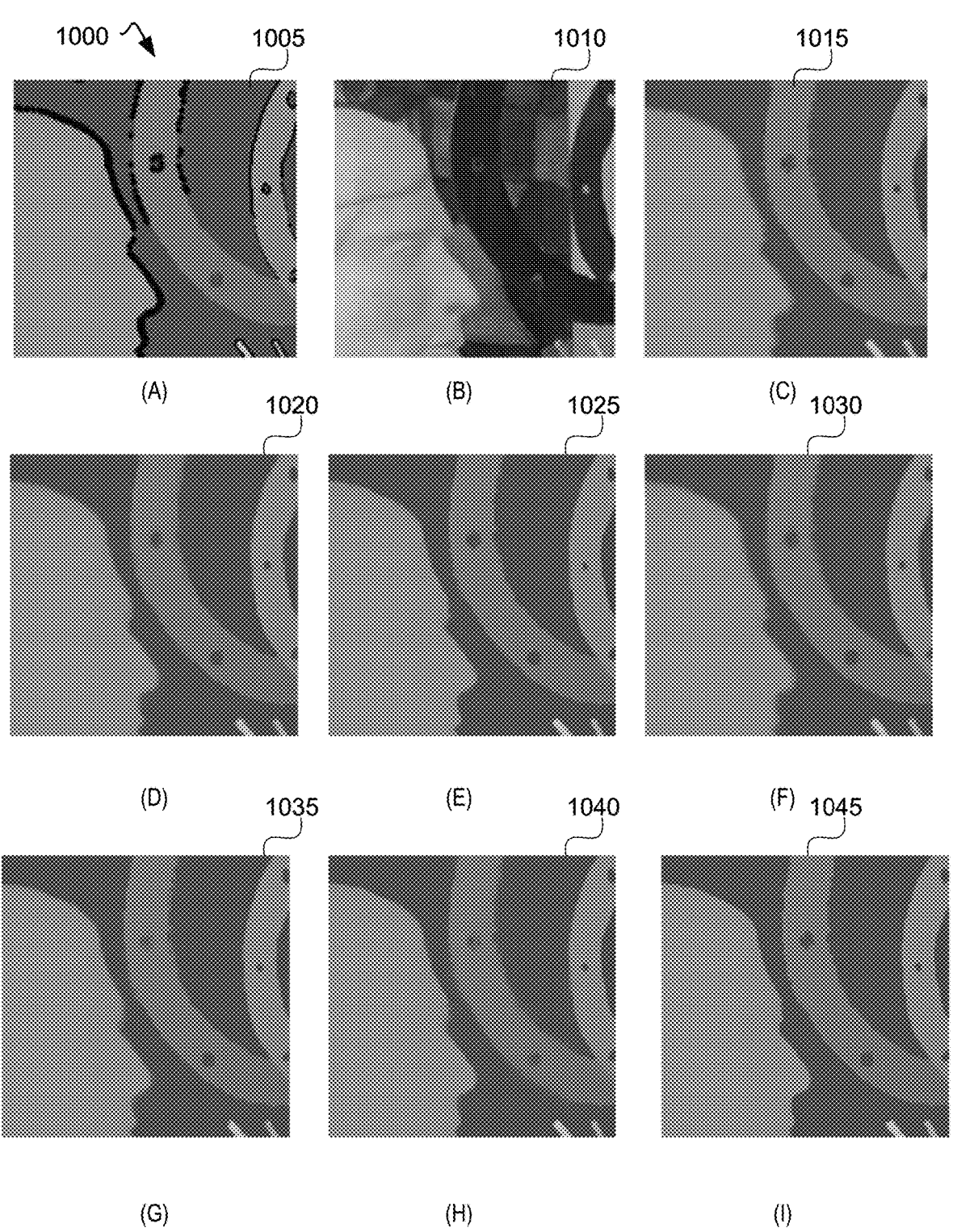
FIG. 10 illustrates an example first illustrative comparison of data obtained when assessing depth data gap filling using the depth data gap fill circuitry of FIG. 4.

FIG. 10 illustrates an example first illustrative comparison of data 1000 obtained when assessing depth data gap filling using the depth data gap fill circuitry 402 of FIG. 4. In the example of FIG. 10, the illustrative comparison of data 1000 includes an example input depth image 1005 and an example texture image 1010 (e.g., RGB image). Likewise, the comparison of depth data gap filling includes example prior algorithms 1015, 1020, 1025, 1030, 1035, and 1040, which can all be compared to the depth data gap fill circuitry 402 algorithm disclosed herein (e.g., corresponding to example disclosed algorithm 1045 of FIG. 10). As shown in the example of FIG. 10, the image represented using the disclosed algorithm 1045 is sharper and with increased accuracy of representation with respect to the input depth image 1005, as compared to the depth map outputs of prior algorithms 1015, 1020, 1025, 1030, 1035, and 1040.

Figure 11:
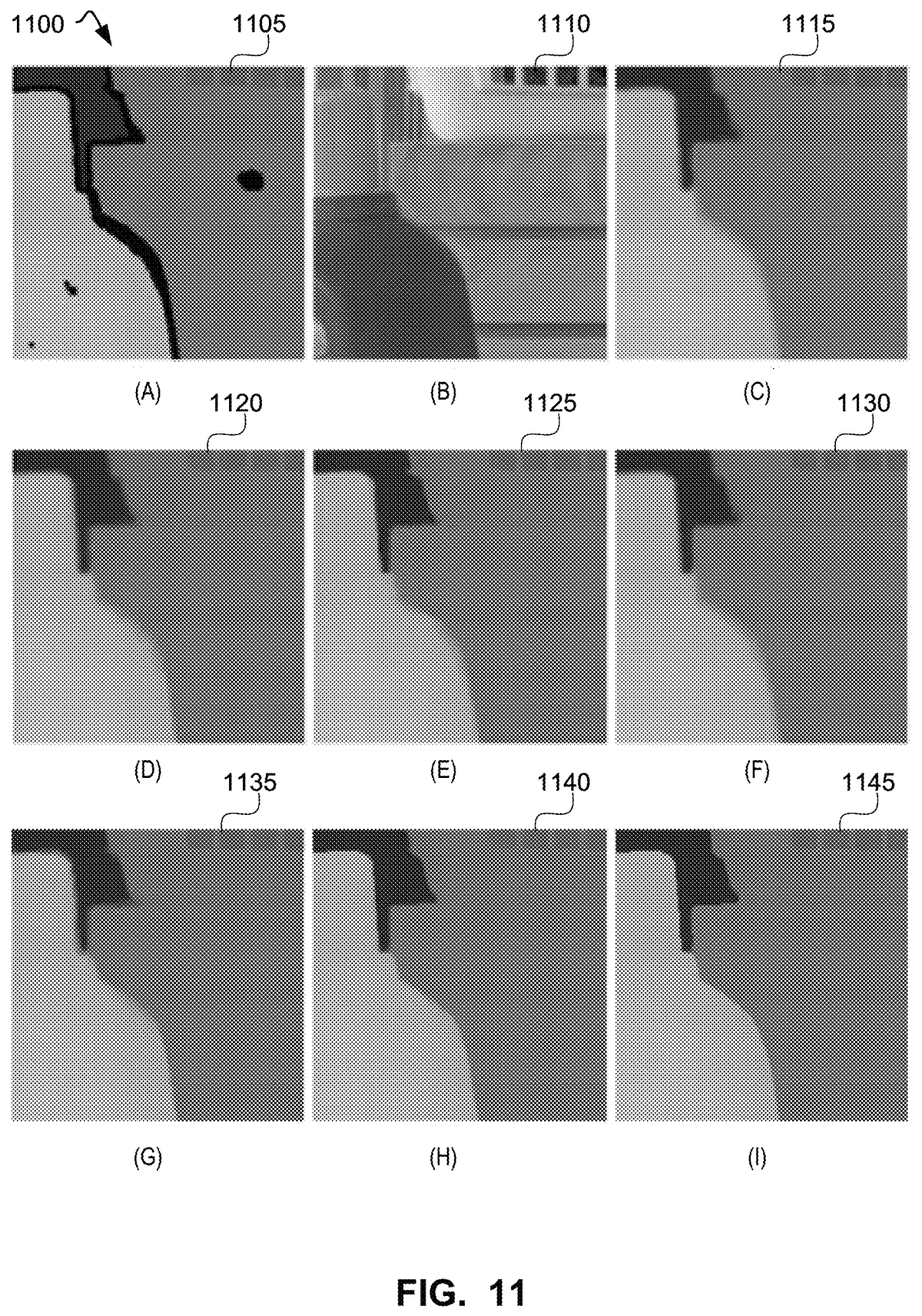

FIG. 11 illustrates an example second illustrative comparison of data 1100 obtained when assessing depth data gap filling using the depth data gap fill circuitry 402 of FIG. 4. In the example of FIG. 11, the illustrative comparison of data 1100 includes an example input depth image 1105 and an example texture image 1110. Likewise, the comparison of depth data gap filling includes example prior algorithms 1115, 1120, 1125, 1130, 1135, and 1140, which can all be compared to the depth data gap fill circuitry 402 algorithm presented herein (e.g., corresponding to example disclosed algorithm 1145). As shown in the example of FIG. 11, the image represented using the disclosed algorithm 1145 is sharper and with increased accuracy of representation with respect to the input depth image 1105, as compared to the depth map outputs of prior algorithms 1115, 1120, 1125, 1130, 1135, and 1140.

Figure 12:
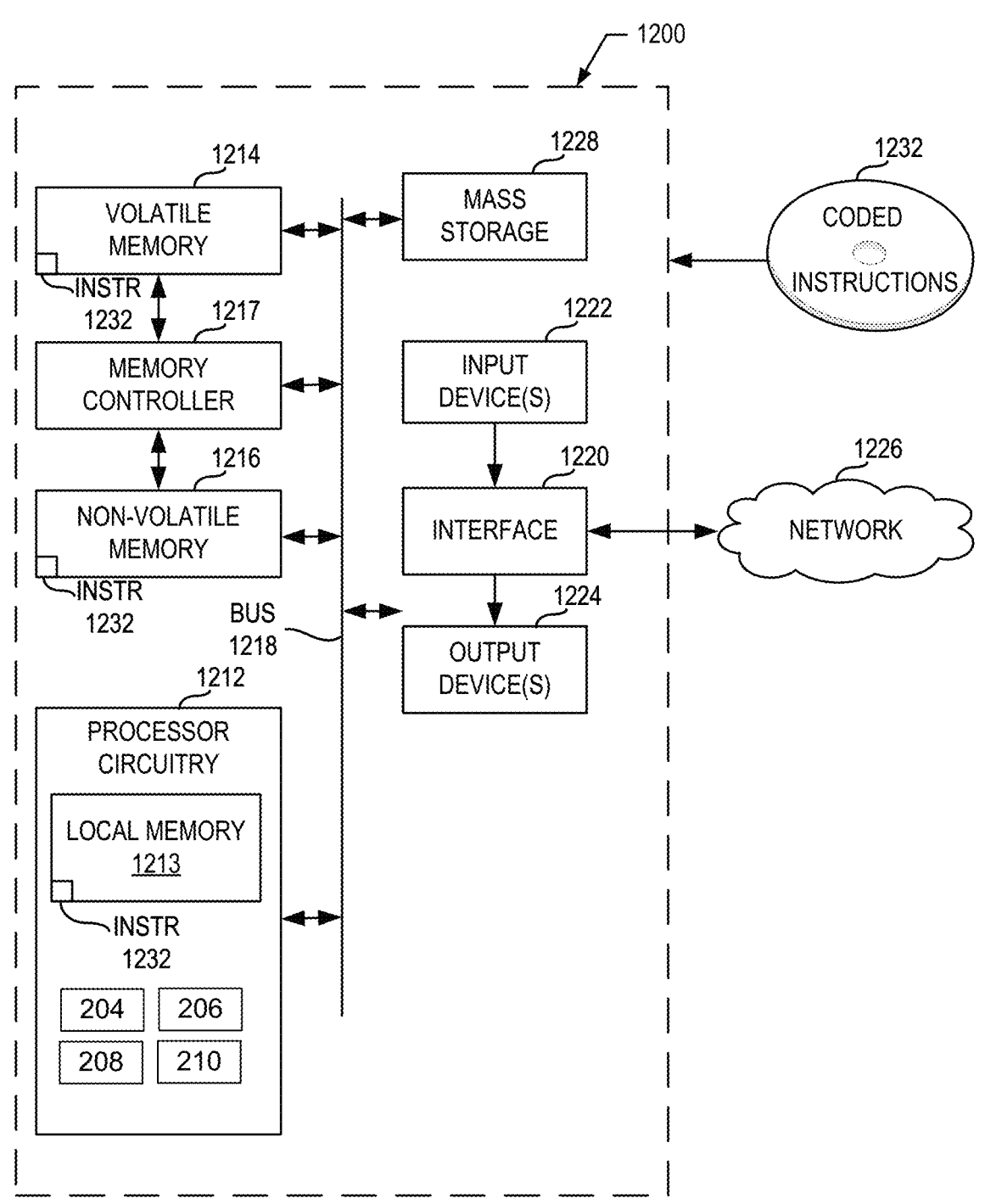
FIG. 12 is a block diagram of an example processing platform including processor circuitry structured to execute the example machine readable instructions of FIGS. 5 and/or 6 to implement the depth adjustment circuitry of FIG. 2.

FIG. 12 is a block diagram of an example processing platform including processor circuitry structured to execute the example machine readable instructions of FIGS. 5 and/or 6 to implement the depth adjustment circuitry 202 of FIG. 2. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs micropro-cessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the patch identification circuitry 204, pixel comparison circuitry 206, threshold identification circuitry 208, and/or depth value removal circuitry 210.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® inter-face, a near field communication (NFC) interface, a PCI interface, and/or a PCIe interface.

In the illustrated example, one or more input devices 1222 are connected to the interface circuitry 1220. The input device(s) 1222 permit(s) a user to enter data and/or com-mands into the processor circuitry 1212. The input device(s) 1202 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connec-tion, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) sys-tems, solid state storage devices such as flash memory devices, and DVD drives.

The machine executable instructions 1232, which may be implemented by the machine readable instructions of FIGS. 5-6, may be stored in the mass storage device 1228, in the volatile memory 1214, in the non-volatile memory 1216, and/or on a removable non-transitory computer readable storage medium such as a CD or DVD.

Figure 13:
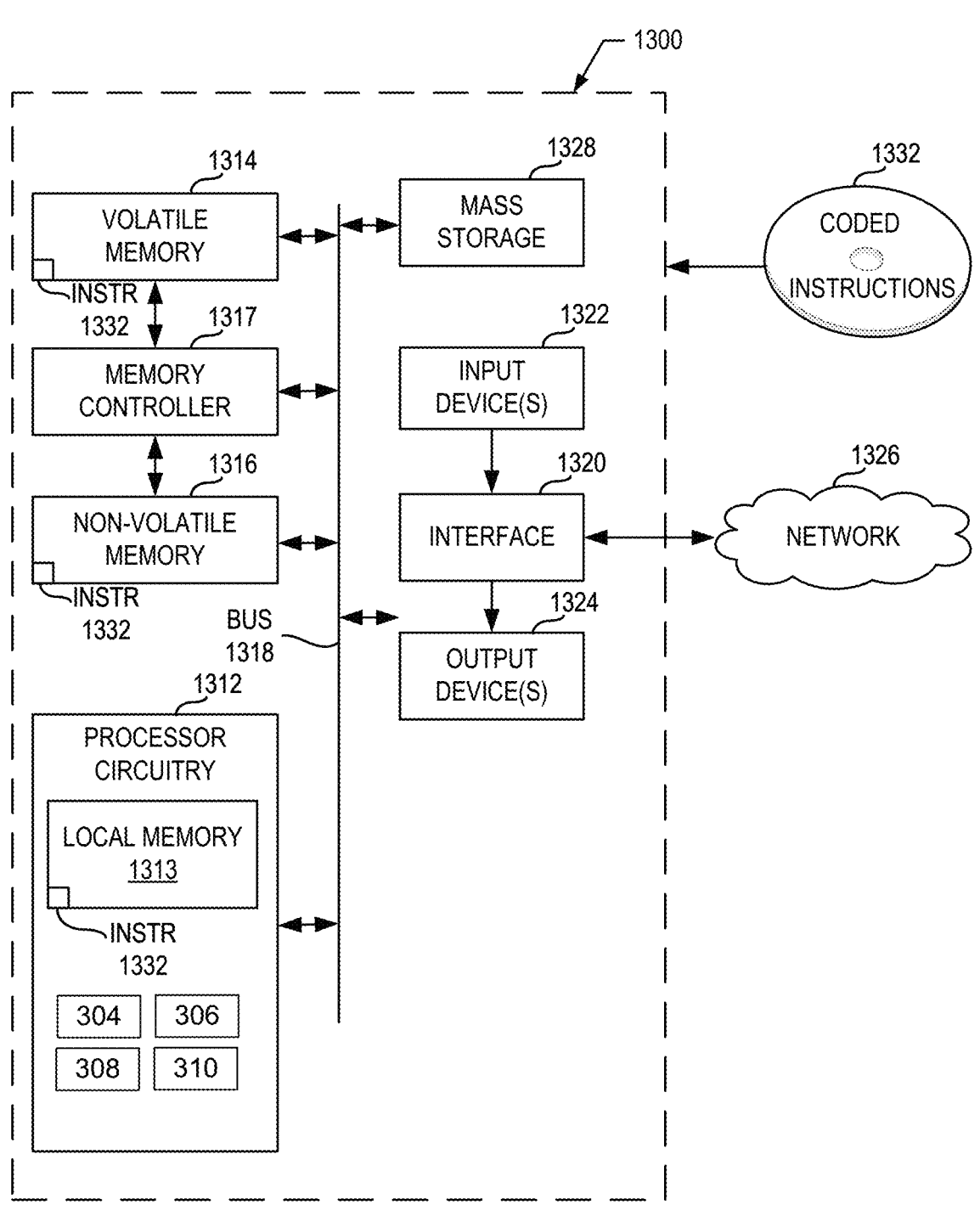
FIG. 13 is a block diagram of an example processing platform including processor circuitry structured to execute the example machine readable instructions of FIGS. 5 and/or 7 to implement the mask selection circuitry of FIG. 3.

FIG. 13 is a block diagram of an example processing platform 1300 including processor circuitry structured to execute the example machine readable instructions of FIGS. 5 and/or 7 to implement the mask selection circuitry 302 of FIG. 3. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs micropro-cessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the data receiver cir-cuitry 304, the distance identification circuitry 306, the threshold circuitry 308, and/or the priority area identification circuitry 310.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® inter-face, a near field communication (NFC) interface, a PCI interface, and/or a PCIe interface.

In the illustrated example, one or more input devices 1322 are connected to the interface circuitry 1320. The input device(s) 1322 permit(s) a user to enter data and/or commands into the processor circuitry 1312. The input device(s) 1302 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1332, which may be implemented by the machine readable instructions of FIGS. 5 and/or 7, may be stored in the mass storage device 1328, in the volatile memory 1314, in the non-volatile memory 1316, and/or on a removable non-transitory computer readable storage medium such as a CD or DVD.

Figure 14:
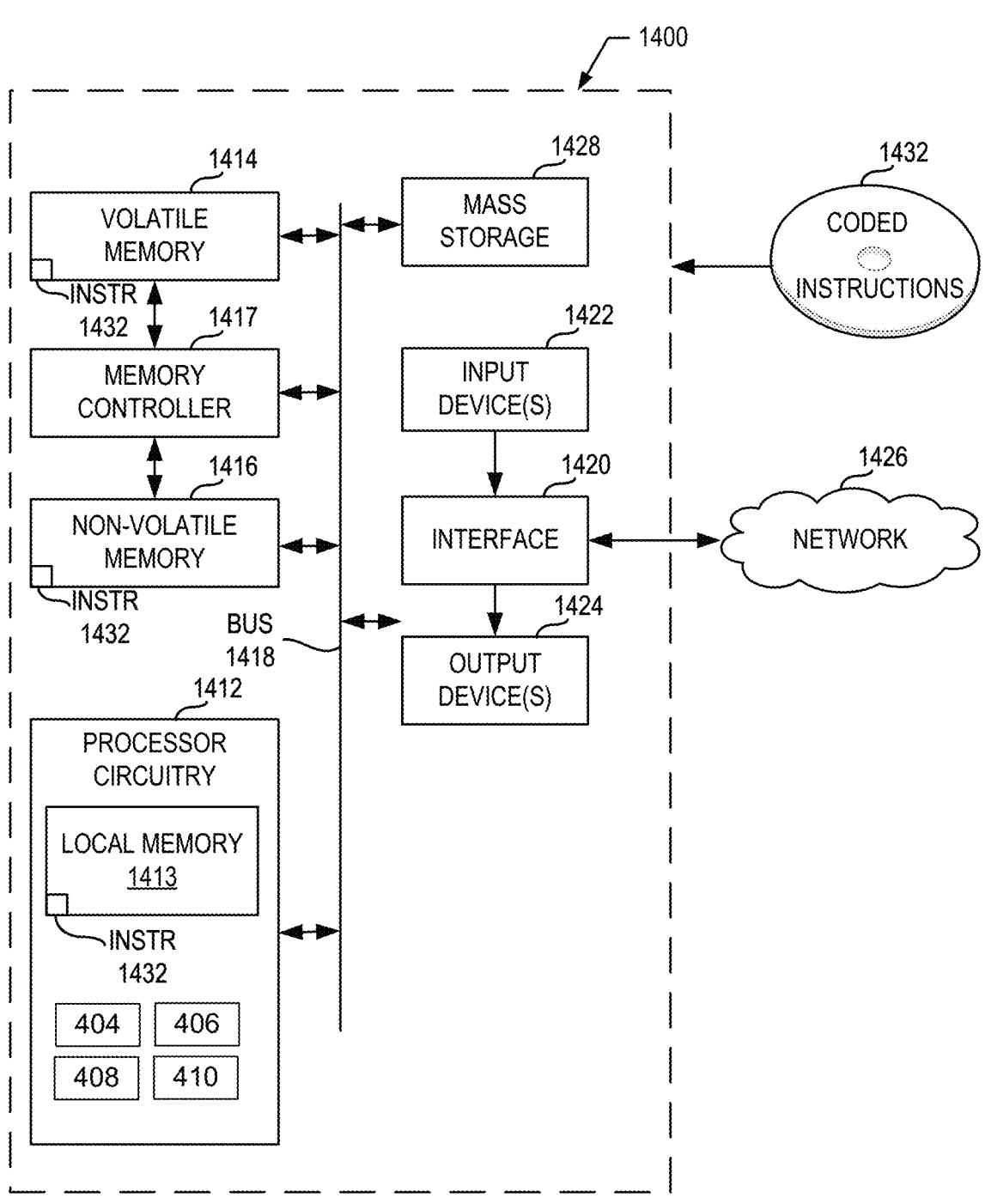
FIG. 14 is a block diagram of an example processing platform including processor circuitry structured to execute the example machine readable instructions of FIGS. 5 and/or 8 to implement the depth data gap fill circuitry of FIG. 4.

FIG. 14 is a block diagram of an example processing platform 1400 including processor circuitry structured to execute the example machine readable instructions of FIGS. 5 and/or 8 to implement the depth data gap fill circuitry 402 of FIG. 4. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the gap identification circuitry 404, the median filter circuitry 406, the joint trilateral filter circuitry 408, and/or the analysis circuitry 410.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1422 are connected to the interface circuitry 1420. The input device(s) 1422 permit(s) a user to enter data and/or commands into the processor circuitry 1412. The input device(s) 1402 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1432, which may be implemented by the machine readable instructions of FIGS. 5 and/or 8, may be stored in the mass storage device 1428, in the volatile memory 1414, in the non-volatile memory 1416, and/or on a removable non-transitory computer readable storage medium such as a CD or DVD.

Figure 15:
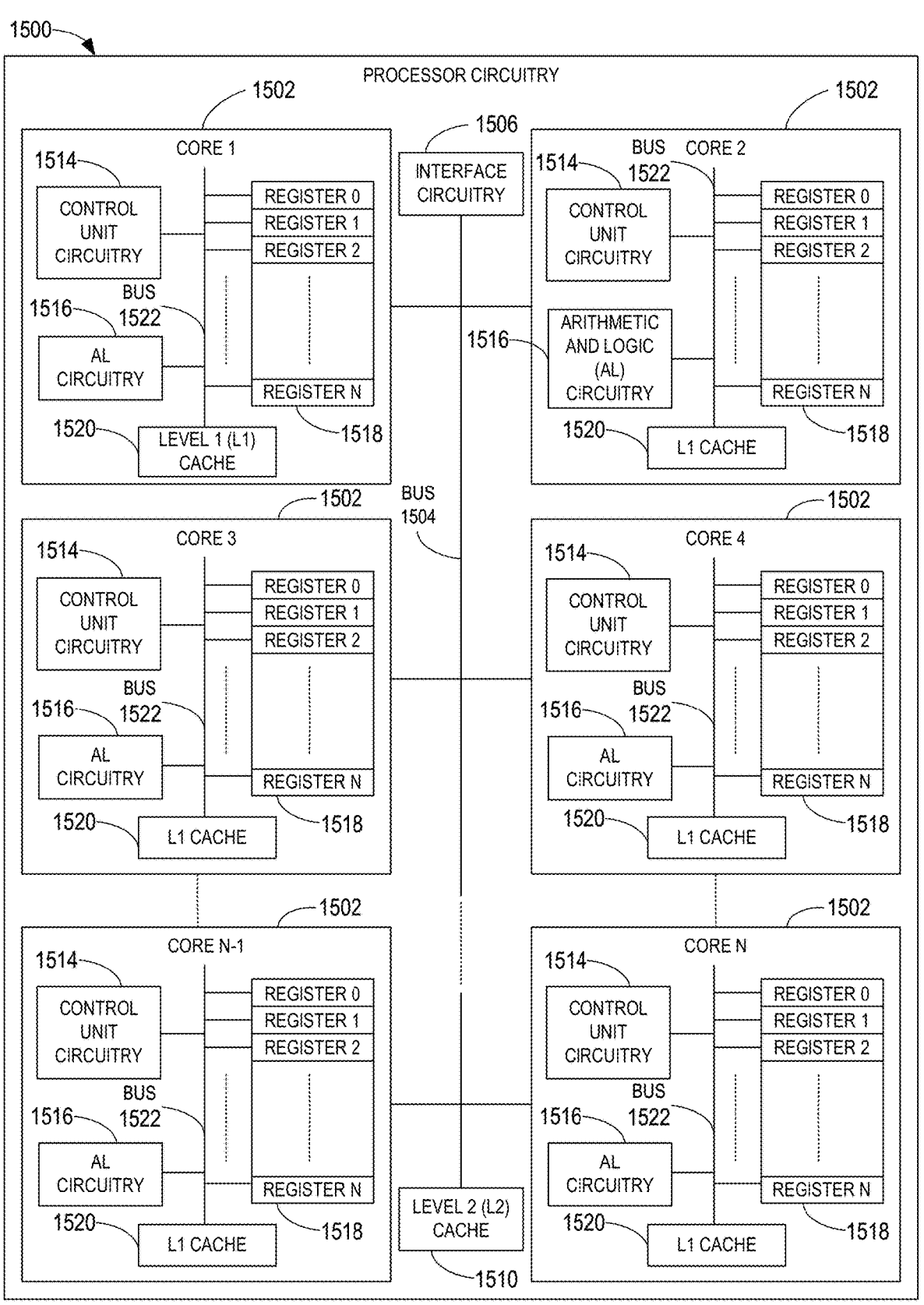
FIG. 15 is a block diagram of an example implementation of the processor circuitry of FIGS. 12, 13, 14.

FIG. 15 is a block diagram of an example implementation of the processor circuitry of FIGS. 12, 13, 14. In this example, the processor circuitry 1212, 1312, 1412 of FIGS. 12, 13, 15 is implemented by a microprocessor 1500. For example, the microprocessor 1500 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowcharts of FIGS. 5-8.

The cores 1502 may communicate by an example bus 1504. In some examples, the bus 1504 may implement a communication bus to effectuate communication associated with one(s) of the cores 1502. For example, the bus 1504 may implement at least one of an Inter-Integrated Circuit (I2C) bus, a Serial Peripheral Interface (SPI) bus, a PCI bus, or a PCIe bus. Additionally or alternatively, the bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2_ cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and an example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The bus 1522 may implement at least one of an I2C bus, a SPI bus, a PCI bus, or a PCIe bus.

Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
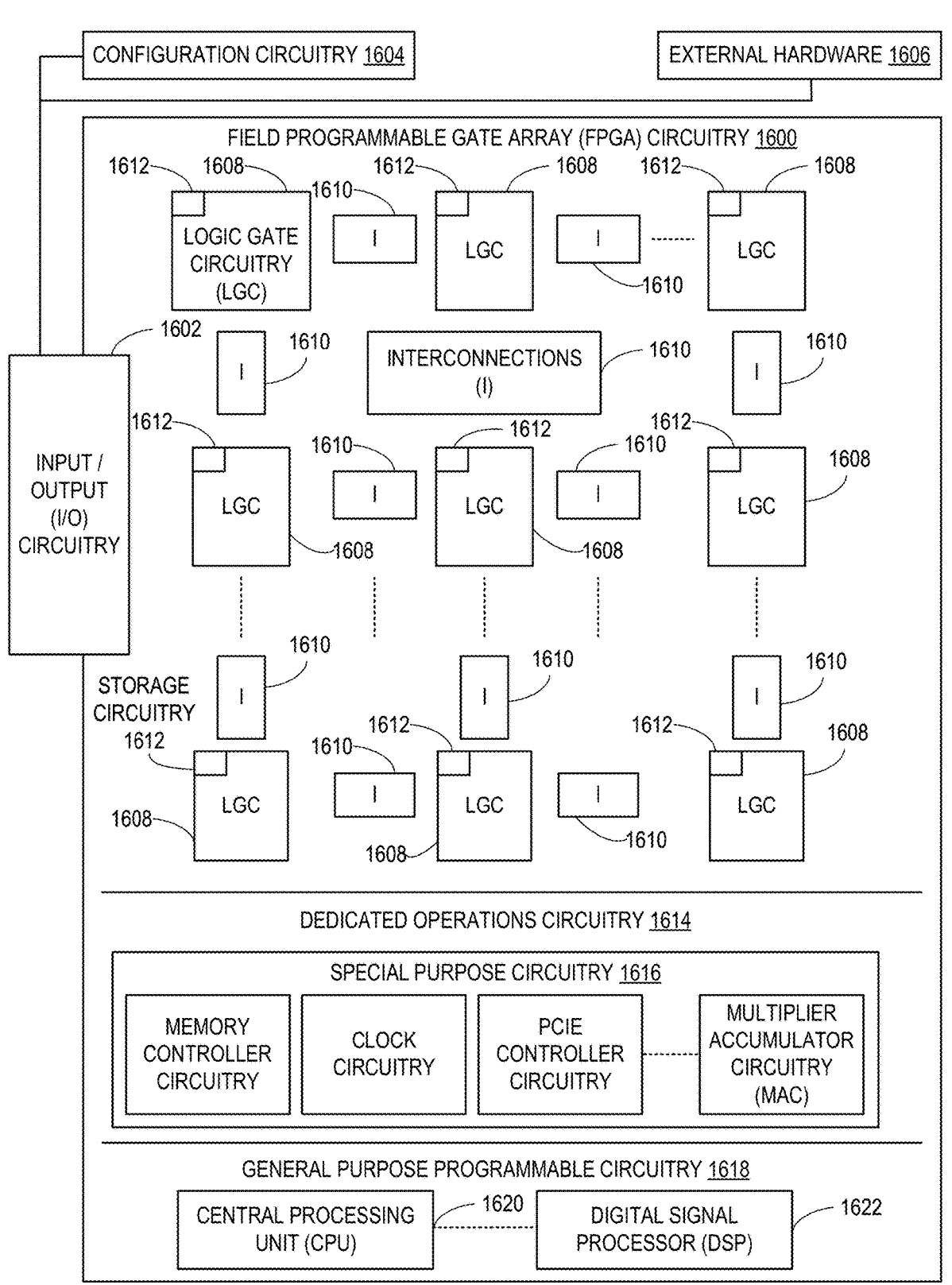
FIG. 16 is a block diagram of another example implementation of the processor circuitry of FIG. 12, 13, 14.

FIG. 16 is a block diagram of another example implementation of the processor circuitry of FIG. 12, 13, 14. In this example, the processor circuitry 1212, 1312, 1412 is implemented by FPGA circuitry 1600. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowcharts of FIGS. 5-8 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowcharts of FIGS. 5-8. In particular, the FPGA 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowcharts of FIGS. 5-8. As such, the FPGA circuitry 1600 may be structured to effectively instantiate some or all of the machine readable instructions of the flowcharts of FIGS. 5-8 as dedicated logic circuits to perform the operations corresponding to those software instructions in a dedicated manner analogous to an ASIC. Therefore, the FPGA circuitry 1600 may perform the operations corresponding to the some or all of the machine readable instructions of FIGS. 5-8 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIGS. 5-8 and/or other desired operations. The logic gate circuitry 1608 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1212, 1312, 1412 of FIGS. 12, 13, 14, many other approaches are contemplated. For example, as mentioned above, modern FPGA circuitry may include an on-board CPU, such as one or more of the example CPU 1620 of FIG. 16. Therefore, the processor circuitry 1212, 1312, 1412 of FIG. 12, 13, 14 may additionally be implemented by combining the example microprocessor 1500 of FIG. 15 and the example FPGA circuitry 1600 of FIG. 16. In some such hybrid examples, a first portion of the machine readable instructions represented by the flowcharts of FIGS. 5-8 may be executed by one or more of the cores 1502 of FIG. 15 and a second portion of the machine readable instructions represented by the flowchart of FIGS. 5-8 may be executed by the FPGA circuitry 1600 of FIG. 16.

In some examples, the processor circuitry 1212, 1312, 1412 of FIGS. 12, 13, 14 may be in one or more packages. For example, the processor circuitry 1500 of FIG. 15 and/or the FPGA circuitry 1600 of FIG. 16 may be in one or more packages. In some examples, an XPU may be implemented by the processor circuitry 1212, 1312, 1412 of FIGS. 12, 13, 14 which may be in one or more packages. For example, the XPU may include a CPU in one package, a DSP in another package, a GPU in yet another package, and an FPGA in still yet another package.

Figure 17:
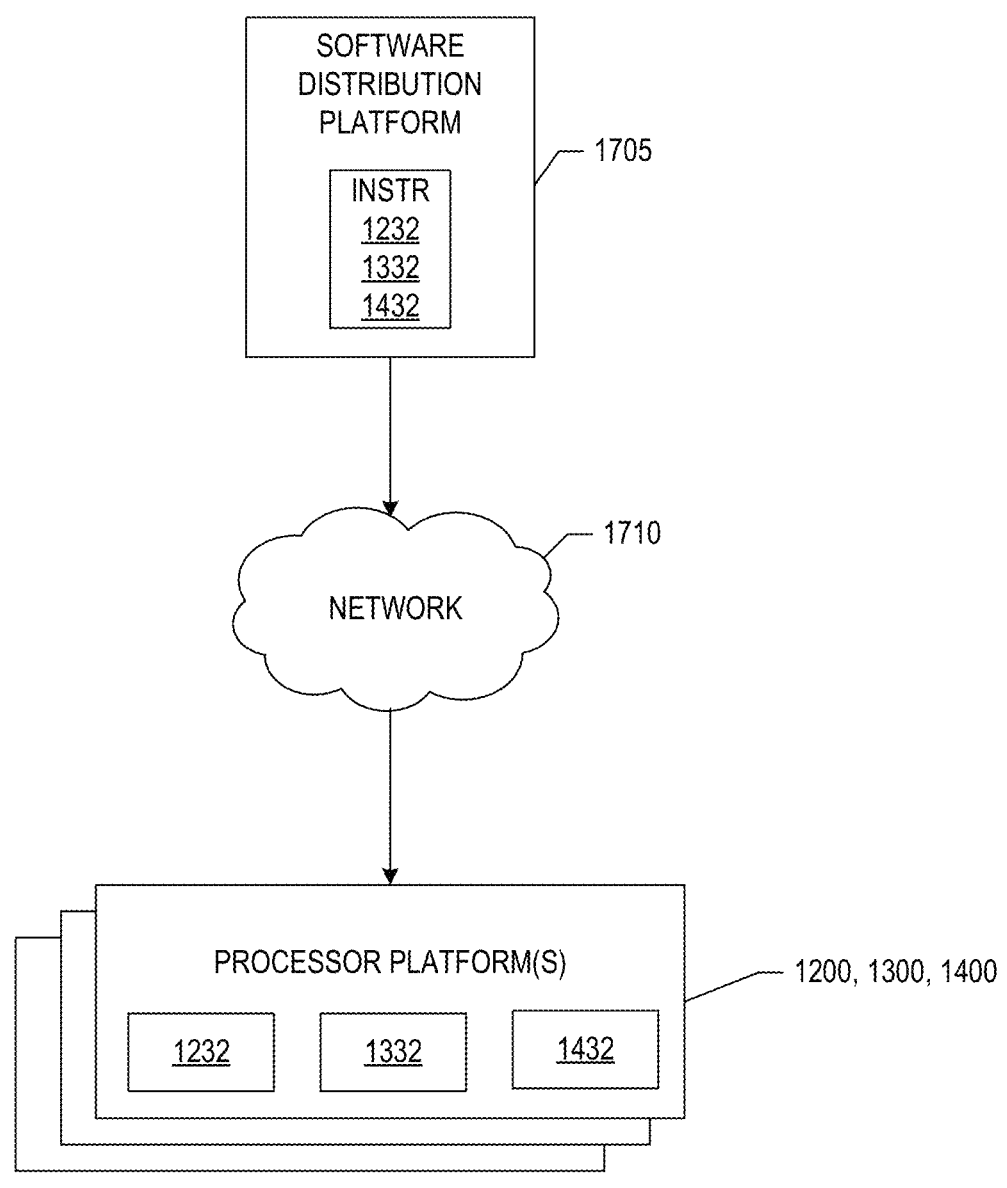
FIG. 17 is a block diagram of an example software distribution platform (e.g., one or more servers) to distribute software (e.g., software corresponding to the example machine readable instructions of FIGS. 5, 6, 7, 8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1705 to distribute software such as the example machine readable instructions 1232, 1332, 1432 of FIGS. 12, 13, 14 to hardware devices owned and/or operated by third parties is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine readable instructions 1232, 1332, 1432 of FIGS. 12, 13, 14. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine readable instructions 1232, 1332, 1432 which may correspond to the example machine readable instructions of FIGS. 5-8, as described above. The one or more servers of the example software distribution platform 1705 are in communication with a network 1710, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232, 1332, 1432 from the software distribution platform 1705. For example, the software, which may correspond to the example machine readable instructions of FIGS. 5-8, may be downloaded to the example processor platform 1200, 1300, 1400 which is to execute the machine readable instructions 1232, 1332, 1432 to implement the depth adjustment circuitry 202, the mask selection circuitry 302, and/or the depth data gap fill circuitry 402. In some example, one or more servers of the software distribution platform 1705 periodically offer, transmit, and/or force updates to the software (e.g., the example machine readable instructions 1232, 1332, 1432 of FIGS. 12, 13, 14) to ensure improvements, patches, updates, etc., are distributed and applied to the software at the end user devices.

From the foregoing, it will be appreciated that example systems, methods, and apparatus allow for fast mask-based depth enhancement to fill in missing depth values in needed pixel points and/or filter out redundant points with pixel(s) or depth value(s) having insufficient accuracy. In examples disclosed herein, a mask-based method for depth image completion includes the use of an additional mask with three modules that provide for incorrect depth adjustments, mask selecting, and/or depth data gap filling. For example, incorrect depth adjustment includes the use of a patch-based analysis to determine which depth value(s) are inaccuracy with the guidance of the generated texture image. In examples disclosed herein, a mask selecting module calculates the probability of each pixel on a depth map according to the mask and/or a camera position. In examples disclosed herein, depth data gap filling uses a two-step pipeline with multiple joint bilateral and/or trilateral filters with identified constraints to iteratively fill in gaps in the depth data. As such, methods and apparatus disclosed herein can be used to improve a user's visual experience by introducing improvements in 3D reconstruction, free view generation, and/or other 3D generative applications.

Example methods, apparatus, systems, and articles of manufacture to perform mask-based depth enhancement for multi-view systems are disclosed herein. Further examples and combinations thereof include the following:

Example 1 includes an apparatus to adjust an input depth image of an image frame including the input depth image and an input color image, the apparatus comprising at least one memory, instructions in the apparatus, and processor circuitry to execute the instructions to identify a color patch and a depth patch for an image pixel in a border area of the image frame, output an adjusted depth map based on at least one of (i) a mismatch between values of the color patch and a center pixel color of the color patch or (ii) a mismatch between values of the depth patch and a center pixel depth of the depth patch, output an adjusted mask map associated with the input depth image based on a position of at least one camera used to capture the image, and perform iterative depth data gap filling based on the adjusted depth map and the adjusted mask map to obtain an adjusted depth image corresponding to the input depth image.

Example 2 includes the apparatus of example 1, wherein the processor circuitry is to perform an erode operation to identify the border area, the border area corresponding to a border of an object in the image frame.

Example 3 includes the apparatus of example 1, wherein the processor circuitry is to identify whether a mismatch area ratio achieves a threshold, the mismatch area ratio identified based on the mismatch between the values of the color patch and the center pixel color and the mismatch between the values of the depth patch and the center pixel depth.

Example 4 includes the apparatus of example 1, wherein the processor circuitry is to determine the adjusted mask map using a Gaussian procedure based on a distance between a pixel of an input mask map and the border area.

Example 5 includes the apparatus of example 1, wherein the processor circuitry is to perform the iterative depth data gap filling to fill missing depth values in positions of the adjusted depth map having zero values with corresponding non-zero values in the adjusted mask map.

Example 6 includes the apparatus of example 1, wherein the processor circuitry is to perform the iterative depth data gap filling using a joint trilateral filter, the joint trilateral filter including a trilateral weight determined using a color constraint, a distance constraint, and a depth constraint.

Example 7 includes the apparatus of example 6, wherein the joint trilateral filter is to eliminate depth values from the adjusted depth map based on a reliability threshold.

Example 8 includes a method to adjust an input depth image of an image frame including the input depth image and an input color image, the apparatus comprising identifying a color patch and a depth patch for an image pixel in a border area of the image frame, outputting an adjusted depth map based on at least one of (i) a mismatch between values of the color patch and a center pixel color of the color patch or (ii) a mismatch between values of the depth patch and a center pixel depth of the depth patch, outputting an adjusted mask map associated with the input depth image based on a position of at least one camera used to capture the image, and performing iterative depth data gap filling based on the adjusted depth map and the adjusted mask map to obtain an adjusted depth image corresponding to the input depth image.

Example 9 includes the method of example 8, further including performing an erode operation to identify the border area, the border area corresponding to a border of an object in the image frame.

Example 10 includes the method of example 8, further including identifying whether a mismatch area ratio achieves a threshold, the mismatch area ratio identified based on the mismatch between the values of the color patch and the center pixel color and the mismatch between the values of the depth patch and the center pixel depth.

Example 11 includes the method of example 8, further including determining the adjusted mask map using a Gaussian procedure based on a distance between a pixel of an input mask map and the border area.

Example 12 includes the method of example 8, further including performing the iterative depth data gap filling to fill missing depth values in positions of the adjusted depth map having zero values with corresponding non-zero values in the adjusted mask map.

Example 13 includes the method of example 8, further including performing the iterative depth data gap filling using a joint trilateral filter, the joint trilateral filter including a trilateral weight determined using a color constraint, a distance constraint, and a depth constraint.

Example 14 includes the method of example 13, wherein the joint trilateral filter is to eliminate depth values from the adjusted depth map based on a reliability threshold.

Example 15 includes At least one non-transitory computer readable storage medium comprising computer readable instructions which, when executed, cause one or more processors to at least identify a color patch and a depth patch for an image pixel in a border area of an image frame, an input depth image of the image frame including the input depth image and an input color image, output an adjusted depth map based on at least one of (i) a mismatch between values of the color patch and a center pixel color of the color patch or (ii) a mismatch between values of the depth patch and a center pixel depth of the depth patch, output an adjusted mask map associated with the input depth image based on a position of at least one camera used to capture the image, and perform iterative depth data gap filling based on the adjusted depth map and the adjusted mask map to obtain an adjusted depth image corresponding to the input depth image.

Example 16 includes the at least one non-transitory computer readable storage medium as defined in example 15, wherein the computer readable instructions cause the one or more processors to perform an erode operation to identify the border area, the border area corresponding to a border of an object in the image frame.

Example 17 includes the at least one non-transitory computer readable storage medium as defined in example 15, wherein the computer readable instructions cause the one or more processors to identify whether a mismatch area ratio achieves a threshold, the mismatch area ratio identified based on the mismatch between the values of the color patch and the center pixel color and the mismatch between the values of the depth patch and the center pixel depth.

Example 18 includes the at least one non-transitory computer readable storage medium as defined in example 15, wherein the computer readable instructions cause the one or more processors to determine the adjusted mask map using a Gaussian procedure based on a distance between a pixel of an input mask map and the border area.

Example 19 includes the at least one non-transitory computer readable storage medium as defined in example 15, wherein the computer readable instructions cause the one or more processors to perform the iterative depth data gap filling to fill missing depth values in positions of the adjusted depth map having zero values with corresponding non-zero values in the adjusted mask map.

Example 20 includes the at least one non-transitory computer readable storage medium as defined in example 15, wherein the computer readable instructions cause the one or more processors to perform the iterative depth data gap filling using a joint trilateral filter, the joint trilateral filter including a trilateral weight determined using a color constraint, a distance constraint, and a depth constraint.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to adjust an input depth image of an image frame including the input depth image and an input color image, the apparatus comprising:
    at least one memory;
    instructions in the apparatus; and
    processor circuitry to execute the instructions to:
        identify a color patch and a depth patch for an image pixel in a border area of the image frame;
        output an adjusted depth map based on at least one of (i) a mismatch between values of the color patch and a center pixel color of the color patch or (ii) a mismatch between values of the depth patch and a center pixel depth of the depth patch;
        output an adjusted mask map associated with the input depth image based on a position of at least one camera used to capture the image; and
        perform iterative depth data gap filling based on the adjusted depth map and the adjusted mask map to obtain an adjusted depth image corresponding to the input depth image.

2. The apparatus of claim 1, wherein the processor circuitry is to perform an erode operation to identify the border area, the border area corresponding to a border of an object in the image frame.

3. The apparatus of claim 1, wherein the processor circuitry is to identify whether a mismatch area ratio achieves a threshold, the mismatch area ratio identified based on the mismatch between the values of the color patch and the center pixel color and the mismatch between the values of the depth patch and the center pixel depth.

4. The apparatus of claim 1, wherein the processor circuitry is to determine the adjusted mask map using a Gaussian procedure based on a distance between a pixel of an input mask map and the border area.

5. The apparatus of claim 1, wherein the processor circuitry is to perform the iterative depth data gap filling to fill missing depth values in positions of the adjusted depth map having zero values with corresponding non-zero values in the adjusted mask map.

6. The apparatus of claim 1, wherein the processor circuitry is to perform the iterative depth data gap filling using a joint trilateral filter, the joint trilateral filter including a trilateral weight determined using a color constraint, a distance constraint, and a depth constraint.

7. The apparatus of claim 6, wherein the joint trilateral filter is to eliminate depth values from the adjusted depth map based on a reliability threshold.

8. A method to adjust an input depth image of an image frame including the input depth image and an input color image, the method comprising:
    identifying a color patch and a depth patch for an image pixel in a border area of the image frame;
    outputting an adjusted depth map based on at least one of (i) a mismatch between values of the color patch and a center pixel color of the color patch or (ii) a mismatch between values of the depth patch and a center pixel depth of the depth patch;

outputting an adjusted mask map associated with the input depth image based on a position of at least one camera used to capture the image; and performing iterative depth data gap filling based on the adjusted depth map and the adjusted mask map to obtain an adjusted depth image corresponding to the input depth image.

9. The method of claim 8, further including performing an erode operation to identify the border area, the border area corresponding to a border of an object in the image frame.

10. The method of claim 8, further including identifying whether a mismatch area ratio achieves a threshold, the mismatch area ratio identified based on the mismatch between the values of the color patch and the center pixel color and the mismatch between the values of the depth patch and the center pixel depth.

11. The method of claim 8, further including determining the adjusted mask map using a Gaussian procedure based on a distance between a pixel of an input mask map and the border area.

12. The method of claim 8, further including performing the iterative depth data gap filling to fill missing depth values in positions of the adjusted depth map having zero values with corresponding non-zero values in the adjusted mask map.

13. The method of claim 8, further including performing the iterative depth data gap filling using a joint trilateral filter, the joint trilateral filter including a trilateral weight determined using a color constraint, a distance constraint, and a depth constraint.

14. The method of claim 13, wherein the joint trilateral filter is to eliminate depth values from the adjusted depth map based on a reliability threshold.

15. At least one non-transitory computer readable storage medium comprising computer readable instructions which, when executed, cause one or more processors to at least:

identify a color patch and a depth patch for an image pixel in a border area of an image frame, an input depth image of the image frame including the input depth image and an input color image;

output an adjusted depth map based on at least one of (i) a mismatch between values of the color patch and a center pixel color of the color patch or (ii) a mismatch between values of the depth patch and a center pixel depth of the depth patch;

output an adjusted mask map associated with the input depth image based on a position of at least one camera used to capture the image; and perform iterative depth data gap filling based on the adjusted depth map and the adjusted mask map to obtain an adjusted depth image corresponding to the input depth image.

16. The at least one non-transitory computer readable storage medium as defined in claim 15, wherein the computer readable instructions cause the one or more processors to perform an erode operation to identify the border area, the border area corresponding to a border of an object in the image frame.

17. The at least one non-transitory computer readable storage medium as defined in claim 15, wherein the computer readable instructions cause the one or more processors to identify whether a mismatch area ratio achieves a threshold, the mismatch area ratio identified based on the mismatch between the values of the color patch and the center pixel color and the mismatch between the values of the depth patch and the center pixel depth.

18. The at least one non-transitory computer readable storage medium as defined in claim 15, wherein the computer readable instructions cause the one or more processors to determine the adjusted mask map using a Gaussian procedure based on a distance between a pixel of an input mask map and the border area.

19. The at least one non-transitory computer readable storage medium as defined in claim 15, wherein the computer readable instructions cause the one or more processors to perform the iterative depth data gap filling to fill missing depth values in positions of the adjusted depth map having zero values with corresponding non-zero values in the adjusted mask map.

20. The at least one non-transitory computer readable storage medium as defined in claim 15, wherein the computer readable instructions cause the one or more processors to perform the iterative depth data gap filling using a joint trilateral filter, the joint trilateral filter including a trilateral weight determined using a color constraint, a distance constraint, and a depth constraint.

* * * * *